US007930879B2

(12) United States Patent
Okugawa et al.

(10) Patent No.: US 7,930,879 B2
(45) Date of Patent: Apr. 26, 2011

(54) CONTROL DEVICE FOR INTERNAL COMBUSTION ENGINE

(75) Inventors: Shinichirou Okugawa, Toyota (JP); Kazuo Kojima, Nagoya (JP); Shigeto Yahata, Oobu (JP); Atsushi Takano, Kariya (JP)

(73) Assignee: DENSO Corporation, Kariya (JP)

( * ) Notice: Subject to any disclaimer, the term of this patent is extended or adjusted under 35 U.S.C. 154(b) by 654 days.

(21) Appl. No.: 11/944,510

(22) Filed: Nov. 23, 2007

(65) Prior Publication Data

US 2008/0120962 A1 May 29, 2008

(30) Foreign Application Priority Data

Nov. 24, 2006 (JP) .................................. 2006-316925

(51) Int. Cl.
*F01N 3/00* (2006.01)
(52) U.S. Cl. ................ 60/295; 60/274; 60/285; 60/286; 60/297
(58) Field of Classification Search .............. 60/274, 60/280, 285, 286, 295, 297
See application file for complete search history.

(56) References Cited

U.S. PATENT DOCUMENTS

| 4,729,220 | A | * | 3/1988 | Terasaka et al. ................. 60/285 |
| 5,983,627 | A | | 11/1999 | Asik |
| 6,978,603 | B2 | * | 12/2005 | Asanuma ......................... 60/297 |
| 7,107,760 | B2 | * | 9/2006 | Shirakawa ....................... 60/285 |
| 7,313,913 | B2 | * | 1/2008 | Okugawa et al. ............... 60/295 |
| 7,340,886 | B2 | * | 3/2008 | Kawashima et al. ........... 60/295 |
| 7,347,043 | B2 | * | 3/2008 | Tahara et al. ................... 60/297 |
| 2002/0157386 | A1 | | 10/2002 | Hiranuma et al. |
| 2004/0206070 | A1 | | 10/2004 | Shirakawa |

FOREIGN PATENT DOCUMENTS

| DE | 198 37 074 | 3/1999 |
| DE | 102 01 465 | 8/2003 |
| DE | 103 33 441 | 2/2004 |
| JP | 11-159376 | 6/1999 |
| JP | 2002-285897 | 10/2002 |
| JP | 2003-172185 | 6/2003 |
| JP | 2003-214152 | 7/2003 |
| JP | 2004-316610 | 11/2004 |

OTHER PUBLICATIONS

German Office Action dated Aug. 11, 2009, issued in corresponding German Application No. 10 2007 047 796.3-26, with English translation.
Office Action (pp. 1-4) dated Aug. 31, 2010 issued in corresponding Japanese Application No. 2006-316925 with an at least partial English-language version thereof.

* cited by examiner

*Primary Examiner* — Binh Q. Tran
(74) *Attorney, Agent, or Firm* — Nixon & Vanderhye P.C.

(57) ABSTRACT

A control device has a throttle valve and fuel injection valves supplying air and fuel to an internal combustion engine, a meter detecting an actual quantity of the air supplied to the engine, a sensor detecting an actual oxygen concentration of an exhaust gas outputted from an exhaust system of the engine, and an ECU controlling the valves. To regenerate an exhaust emission purifier disposed in the exhaust system at a target temperature appropriate to the regeneration of the purifier, the ECU determines a target oxygen concentration corresponding to a target air-fuel ratio and a basic air quantity according to a torque required of the engine and controls the valves according to the actual air quantity and the actual oxygen concentration to supply a basic quantity of fuel and the basic quantity of air to the engine at the target air-fuel ratio.

22 Claims, 12 Drawing Sheets

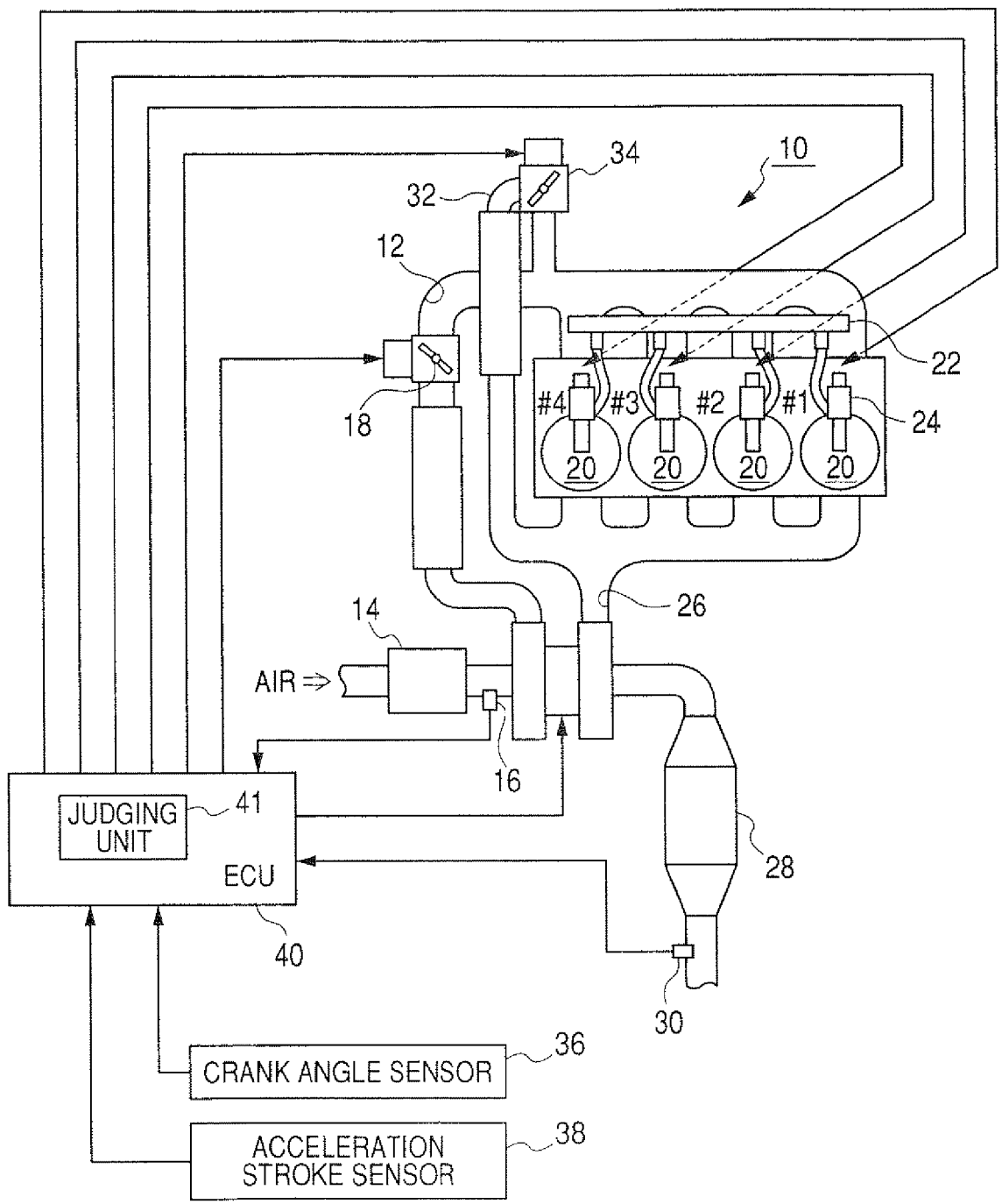

CONTROL DEVICE FOR INTERNAL COMBUSTION ENGINE

CROSS-REFERENCE TO RELATED APPLICATION

This application is based upon and claims the benefit of priority of the prior Japanese Patent Application 2006-316925 filed on Nov. 24, 2006 so that the contents of which are incorporated herein by reference.

BACKGROUND OF THE INVENTION

1. Field of the Invention

The present invention relates to a control device which controls regeneration of an exhaust emission purifier disposed in an exhaust system of an internal combustion engine.

2. Description of Related Art

A diesel particulate filter (DPF) is disposed as an exhaust emission purifier of an exhaust system on an outlet side of an exhaust pipe of a diesel engine representing an internal combustion engine. The filter catches particulate matters existing in an exhaust gas of the engine. A control device of the engine estimates a quantity of the particulate matters caught and deposited in the filter. When the estimated quantity of the particulate matters exceeds a predetermined value, the control device performs a regeneration control to regenerate the filter. More specifically, the control device controls the engine to heighten the temperature of the filter, so that the deposited particulate matters are burned off and removed from the filter.

As a technique for heightening the temperature of the filter, an engine additionally performs a fuel injection (i.e., post injection of fuel) according to a regeneration control at a timing, which is sufficiently retarded from a timing of the compression top dead center, to burn fuel of the post injection in an exhaust system. Alternately, a start timing of fuel injection is retarded to heighten a temperature of an exhaust gas. When the temperature of the diesel particulate filter is heightened for the purpose of regenerating the filter, it is desired to prevent the filter from being excessively risen. Therefore, the fuel injection is controlled in the regeneration of the filter such that the filter is set within a temperature range appropriate for combustion of particulate matters deposited in the filter.

Published Japanese Patent First Publication No. 2003-172185 discloses a technique for regenerating a diesel particulate filter. In this technique, the temperature of an emission gas is detected by an emission gas temperature sensor disposed on a down stream side of the filter, a control device of a diesel engine performs a feedback control so as to adjust the emission gas temperature at a target emission gas temperature. Therefore, the temperature of the filter is indirectly controlled. Further, this Publication has proposed another technique. In this technique, to indirectly control the temperature of the filter, oxygen catalyst is disposed on an upper stream side of the filter, and an exhaust gas temperature sensor is disposed between the oxygen catalyst and the filter. The control device performs a feedback control so as to adjust an exhaust gas temperature detected by the sensor to a target exhaust gas temperature.

However, injection characteristics of a fuel injection valve differ from those of another fuel injection valve, or injection characteristics of a fuel injection valve are changed with time when the valve is operated in an engine for a long time. Therefore, when actual injection characteristics of a fuel injection valve differ from injection characteristics originally designed, there is a high probability that a quantity of fuel injected from the valve for the regeneration control may be shifted from an appropriate value. In this case, particulate matters of the filter are burned by fuel excessively or insufficiently injected, so that the temperature of the filter is undesirably set out of a temperature range appropriate for the regeneration control. Therefore, when the temperature of the filter is controlled according to an emission or exhaust gas temperature detected by a sensor, following problems may be arisen.

When a fuel injection control is changed from a normal operation mode to a filter regeneration mode, a diesel engine is set in transitional operation conditions, and the temperature of the filter is quickly heightened by a combustion of particulate matters of the filter. However, because a heat capacity of the filter is large, it takes a long time until the temperature of an emission gas is changed to the temperature of the filter, so that there is a large time lag between a change in the emission gas temperature and a change in the filter temperature. Therefore, when a control device performs a feedback control according to an emission gas temperature detected on a down stream side of the filter, there is a high probability that the filter temperature may be set out of a temperature range appropriated for the regeneration control.

Further, even when a control device performs a feedback control according to a temperature of an exhaust gas between the oxygen catalyst and the filter on an upper stream side of the filter, the large heat capacity of the filter prevents the control device from controlling the temperature of the filter exposed to the exhaust gas within a desired temperature range.

SUMMARY OF THE INVENTION

An object of the present invention is to provide, with due consideration to the drawbacks of the conventional control device of an internal combustion engine, a control device which appropriately controls regeneration of an exhaust emission purifier disposed in an exhaust system of an internal combustion engine.

According to an aspect of this invention, the object is achieved by the provision of a control device controlling regeneration of an exhaust emission purifier disposed in an exhaust system of an internal combustion engine. The control device comprises an air-fuel ratio detecting element that detects an actual air-fuel ratio of a quantity of air supplied to the engine and a quantity of fuel supplied to the engine, an operating element that supplies the air or the fuel to the engine, and an air-fuel ratio controller that determines a target air-fuel ratio and controls the operating element according to the actual air-fuel ratio and the target air-fuel ratio in the regeneration of the exhaust emission purifier such that the actual air-fuel ratio is controlled to the target air-fuel ratio according to a feedback control to control a temperature of the exhaust emission purifier.

With this structure of the control device, it is designed that a basic quantity of fuel is supplied to the engine every stroke of a crank shaft according to designed fuel injection characteristics. When the fuel is supplied to the engine according to the designed fuel injection characteristics, air and fuel are supplied to the engine at a target air-fuel ratio in the regeneration of the exhaust emission purifier, and a temperature of the exhaust mission purifier is maintained at a target value appropriate to the regeneration of the exhaust emission purifier. The target air-fuel ratio is obtained when a basic quantity of fuel and another basic quantity of air are supplied to the engine. However, fuel is actually supplied to the engine according to actual fuel injection characteristics differentiated from the designed fuel injection characteristics. Therefore, an actual air-fuel ratio is differentiated from the target air-fuel ratio.

In the present invention, the air-fuel ratio controller determines a target air-fuel ratio and controls a quantity of air or fuel supplied from the operating element to the engine according to the actual air-fuel ratio and the target air-fuel ratio. Therefore, the actual air-fuel ratio is controlled to the target air-fuel ratio according to a feedback control, and a temperature of the exhaust emission purifier is controlled.

Accordingly, the control device can appropriately control regeneration of the exhaust emission purifier.

BRIEF DESCRIPTION OF THE DRAWINGS

FIG. 1 is a view of a diesel engine system according to embodiments of the present invention;

DETAILED DESCRIPTION OF THE PREFERRED EMBODIMENTS

Figure 2A:
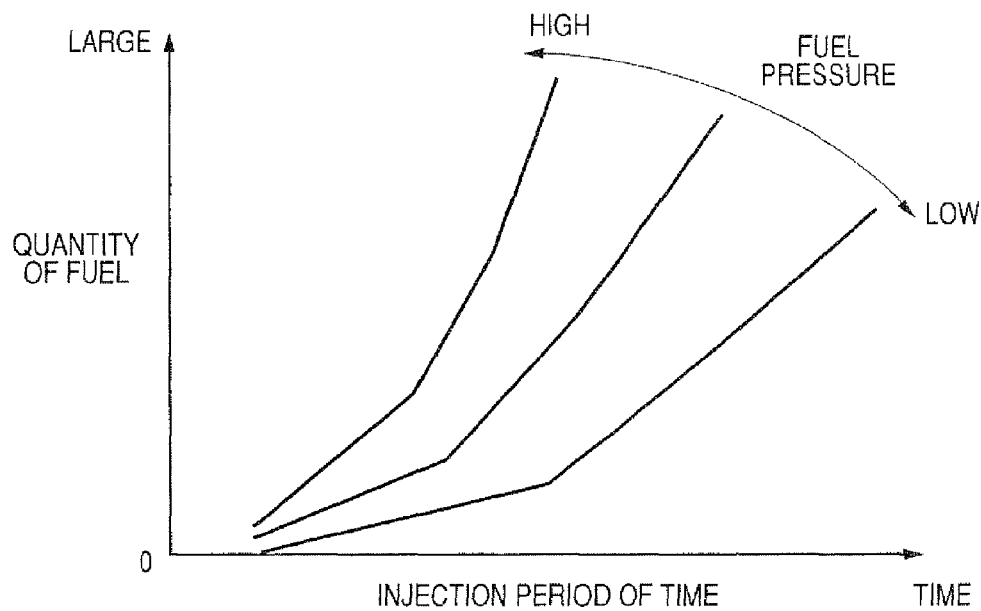
FIG. 2A is a view showing a relation between a fuel injection quantity and an injection period of time in a fuel injection valve with respect to a fuel pressure.

Embodiments of the present invention will now be described with reference to the accompanying drawings, in which like reference numerals indicate like parts, members or elements throughout the specification unless otherwise indicated.

Embodiment 1

In this embodiment, a control device of an on-vehicle diesel engine is described to represent a control device of an internal combustion engine. FIG. 1 is a view of a diesel engine system of a vehicle according to the first embodiment. A diesel engine 10 shown in FIG. 1 is, for example, disposed on a vehicle. As shown in FIG. 1, the engine 10 has four cylinders #1, #2, #3 and #4 with respective combustion chambers 20 and respective fuel injection valves 24 (representing operating elements). Air is sent to the engine 10 through an intake pipe 12 communicating with each of the chambers 20. The engine 10 has an air cleaner 14, an air flow meter 16 (representing air quantity detecting element) and a throttle valve 18 (representing operating element) on an upper stream side of the pipe 12. A flow rate of the air is measured in the meter 16 and is adjusted in the valve 18. A predetermined quantity of fuel accumulated in a common rail 22 is injected into the corresponding chamber 20 through each valve 24. Therefore, each chamber 20 receives a mixed gas of fuel and air from the common rail 22 and the pipe 12, the mixed gas is fired, and a rotational force is generated in the engine 10 as an output torque.

An exhaust gas produced in the chambers 20 is outputted to an exhaust pipe 26. A diesel particulate filter (DPF) 28 with oxygen catalyst is disposed as an exhaust emission purifier on an outlet side of the pipe 26 to catch particulate matters of the exhaust gas. The exhaust gas is outputted to the atmosphere as an emission gas. An oxygen concentration sensor 30 representing an air-fuel ratio detecting element is disposed on a down flow side of the filter 28 to detect a concentration of oxygen included in the exhaust gas. A control device of the engine 10 is composed of the ECU 40, the meter 16, the sensor 30 and the valves 18 and 24.

An exhaust gas recirculation (EGR) pipe 32 extends from the exhaust pipe 26 and communicates with the intake pipe 12 through an EGR valve 34. This valve 34 can adjust an area of a passage communicating the pipes 12 and 32. A quantity of exhaust gas recirculated to the pipe 12 is adjusted in the valve 34. This engine system further has a crank angle sensor 36 for detecting a rotational angle of a crank shaft of the engine 10, an acceleration stroke sensor 38 for detecting a stroke position of an accelerator pedal, and various sensors (not shown) for detecting requests of a driver.

The engine system further has an electronic control unit (ECU) 40 for controlling various actuators such as the valves 24, 34 and 18 according to operation conditions of the engine 10 detected by the meter 16 and the sensors 30 and 36 and requests of the driver detected by the various sensors including the sensor 38. The ECU 40 adjusts output characteristics of the engine 10 such as an output torque and characteristics of the exhaust gas. More specifically, the ECU 40 receives a quantity of air taken in the engine 10 from the meter 16 and receives an oxygen concentration of the exhaust gas from the sensor 30. In response to the detection values of the meter 16 and the sensor 30, the ECU 40 determines control values of the valves 18 and 24 and controls the valves 18 and 24 by the control values. Therefore, the ECU 40 acts as an air-fuel ratio controller.

For example, the ECU 40 controls each valve 24 to adjust a quantity of fuel injected from the valve 24. An on-off valve is used as the valve 24. When being energized, the valve 24 is opened. In contrast, when not receiving electric power, the valve 24 is closed. Therefore, the valve 24 is opened or closed according to an on-off control action. The valve 24 differs from a valve with a nozzle needle wherein a lift of the nozzle needle is continuously adjustable. The ECU 40 controls the valve 18 to adjust a quantity of air taken in the engine 10.

Figure 2B:
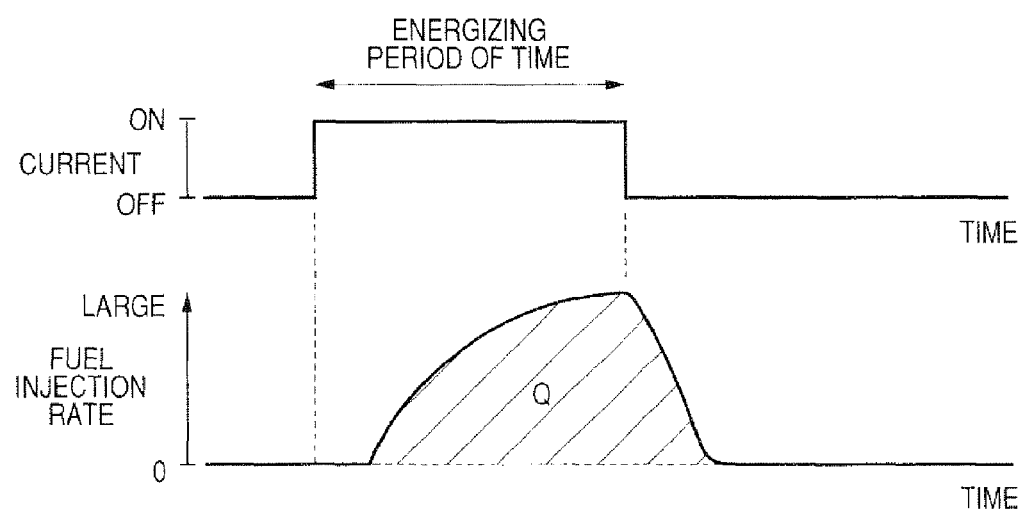
FIG. 2B shows a fuel injection rate with respect to time in the valve.

FIG. 2A is a view showing a relation between a fuel injection quantity and an injection period of time in each valve 24 with respect to a fuel pressure, and FIG. 2D shows a fuel injection rate with respect to an energizing period of time in the valve 24. To operate the valves 24, the ECU 40 converts a fuel injection quantity into an injection period of time and outputs an instruction indicating the injection period of time. As shown in FIG. 2A, an injection period of time required for injecting a predetermined quantity of fuel is shortened as a pressure of the fuel in the common rail 22 is heightened. Further, when a pressure of the fuel is set to be constant, an injection fuel quantity is increased as an injection period of time is lengthened. As shown in FIG. 2B, when the valve 24 is energized during an energizing period of time equivalent to an injection period of time, the fuel is injected during an actual injection period of time delayed from the energizing period of time. Therefore, the ECU 40 can control an injected fuel quantity by adjusting an energizing period of time in the valve 24. The ECU 40 sets an energizing period of time in each valve 24 to determine a quantity of the fuel injected from the valve 24.

The ECU 40 estimates a quantity of particulate matters deposited in the filter 28 according to a well-known method. When the estimated quantity exceeds a predetermined value, the ECU 40 controls the engine 10 to perform the regeneration of the filter 28. That is, the ECU 40 controls the valves 24 of the engine 10 to additionally inject fuel, so that the deposited particulate matters are burned by the additional fuel, and the filter 28 is maintained at a high temperature by combustion of the additional fuel.

Figure 3:
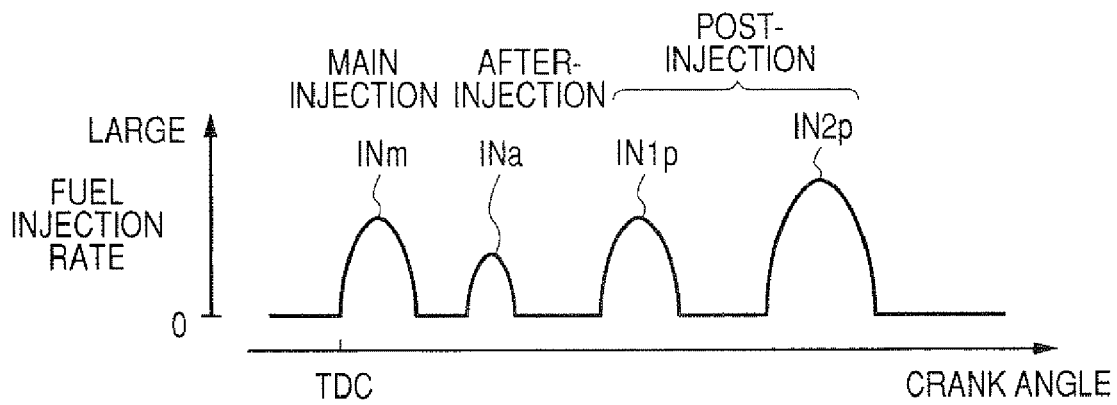
FIG. 3 shows a timing chart of fuel injections with respect to a crank angle in a regeneration control.

FIG. 3 shows a timing chart of fuel injections with respect to a crank angle in the regeneration control. As shown in FIG. 3, when the engine 10 is under a normal control to generate an output torque, the BCU 40 controls the valves 24 to perform a main injection INm every stroke of a crank shaft. In contrast, when the control of the engine 10 is changed to a regeneration control to regenerate the filter 28, the ECU 40 controls the valves 24 to perform a multi-stage fuel injection in each valve 24 every stroke of a crank shaft. In this multi-stage fuel injection, the main injection INm, an after-injection INa, a first post-injection IN1p and a second post-injection IN2p are performed in that order. The main injection INm is performed just after a timing of a compression top dead center TDC and has a maximum fuel injection quantity among the injections. The main injection INm is contributes to the generation of an output torque of the engine 10. The after-injection INa is performed to burn the particulate matters of the filter 28. The temperature of the filter 28 becomes higher than the temperature of the exhaust gas by the after-injection INa. The ECU 40 performs the post-injections IN1p and IN2p to control the temperature of the exhaust gas at a high value for the purpose of regenerating the filter 28. The after-injection INa and the post-injections IN1p and IN2p are performed on a timing retard side as compared with the main injection INm. Because fuel not burned in the chambers 20 is burned in the filter 28 due to the multi-stage fuel injections, the temperature of the filter 28 can be heightened.

Further, the valves 24 are designed such that the valves 24 inject basic quantities of fuel in this multi-stage fuel injection every stroke of a crank shaft according to designed fuel injection characteristics. When the valves 24 act as designed so as to inject the basic quantities of fuel in the multi-stage fuel injection, the ECU 40 can control the engine 10 to maintain the temperature of the filter 28 at a target value appropriate to the regeneration of the filter 28 in a stationary state of the regeneration control, while generating a required torque corresponding to a stroke position of an accelerator pedal during the running of a vehicle.

However, when the valves 24 act out of design, actual fuel injection characteristics of the valves 24 are shifted or differentiated from the designed fuel injection characteristics. In this case, there is a high probability that the ECU 40 cannot control the temperature of the filter 28 at an appropriate value in the regeneration of the filter 28. To prevent this problem, in the regeneration of the filter 28 according to this embodiment, the ECU 40 sets a target air-fuel ratio according to a target temperature of the filter 28 and controls an actual air-fuel ratio to the target air-fuel ratio according to a feedback control. Therefore, the filter 28 is indirectly controlled to the target temperature.

The principle of the regeneration control performed in the ECU 40 is now described.

A quantity A of intake air is taken into the chambers 20 of the engine 10 every combustion cycle. A quantity F of fuel is injected into the chambers 20 of the engine 10 every combustion cycle. An air-fuel ratio of the engine 10 denotes a ratio A/F of the air quantity A to the fuel quantity F. This ratio is defined by a weight ratio. The fuel quantity F correlates to a combustion energy $E_{total}$ of the fuel. That is, the energy $E_{total}$ is almost proportional to the quantity F. The air quantity A correlates to a quantity of the exhaust gas exclusive of fuel. More specifically, a heat capacity $C_a$ (i.e., product of quantity A and specific heat of air) of the exhaust gas except for fuel is almost proportional to the quantity A. Therefore, an air-fuel ratio A/F is expressed according to a formula (1) by using a coefficient K1.

$$A/F = K1 \times C_a / E_{total} \quad (1)$$

The air quantity A is normally in excess of ten times the fuel quantity F. Therefore, the heat capacity Ca is approximated by a heat capacity $C_{gas}$ of the exhausted gas, so that the formula (1) can be replaced with a formula (2).

$$A/F = K1 \times C_{gas} / E_{total} \quad (2)$$

The combustion energy $E_{total}$ is changed to a kinetic energy $E_{trq}$ and a thermal energy $E_{ex}$. The energy $E_{trq}$ contributes to the generation of an output torque. A vehicle is driven by the output torque. Therefore, the formula (2) can be replaced with a formula (3).

$$A/F = K1 \times C_{gas} / (E_{trq} + E_{ex}) \quad (3)$$

The thermal energy $E_{ex}$ heightens the temperature of air taken in the chambers 20 of the engine 10 from an inlet temperature Tin of the air taken in the engine 10 to an outlet temperature Tout of the exhaust gas outputted from the filter 28. The thermal energy includes an energy generated by an exothermic reaction of fuel not burned in the chambers 20 with oxygen, and this energy heightens the temperature of the exhaust gas. When the temperature of the filter 28 is in a stationary state during the regeneration control, the temperature of the exhaust gas outputted from the filter 28 is equal to the temperature of the filter 28. Therefore, a temperature rise $\Delta T_{dpf}$ ($\Delta T_{dpf}$=Tout-Tin) of the exhaust gas can be expressed according to a formula (4) by using a coefficient K2.

$$C_{gas} \times \Delta T_{dpf} = K2 \times E_{ex} \quad (4)$$

When the formulas (3) and (4) are combined so as to eliminate the thermal energy $E_{ex}$, a formula (5) is obtained.

$$A/F = K1 / \{(E_{trq}/C_{gas}) + (\Delta T_{dpf}/K2)\} \quad (5)$$

The heat capacity $C_{gas}$ is approximated to a product of the quantity A and a specific heat of the exhausted gas.

Therefore, when the ECU 40 controls the engine 10 such that each of the air-fuel ratio A/F and the ratio $E_{trq}/C_{gas}$ becomes constant, the temperature rise $\Delta T_{dpf}$ of the exhaust gas can be adjusted to a constant value. Therefore, the ECU 40 can prevent the temperature of the filter 28 from being excessively heightened.

Figure 4:
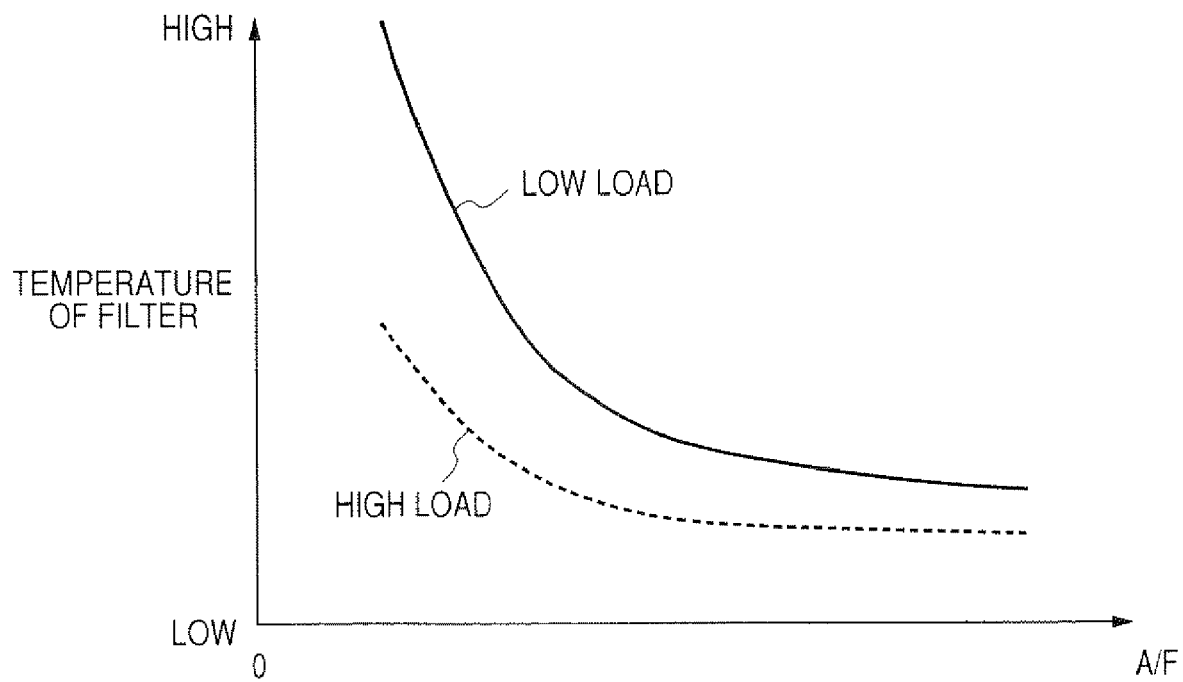
FIG. 4 shows a relation between an air-fuel ratio and temperature of a diesel particulate filter with respect to a load on a diesel engine.

Demands of the formula (5) are now compared with results of operations of the engine 10 shown in FIG. 4. FIG. 4 shows a relation between the air-fuel ratio A/F and the temperature of the filter 28 with respect to a load on the engine 10. The load on the engine 10 correlates with the output torque generated in the engine 10. As shown in FIG. 4, the temperature of the filter 28 is changed with the air-fuel ratio A/F and the load on the engine 10. More specifically, when the load is constant, the engine system shown in FIG. 1 satisfies a first feature that the temperature of the filter 28 is decreased with an increase of the air-fuel ratio A/F. Because a constant load can roughly be regarded as a ratio $E_{trq}/C_{gas}$ set constant, the first feature accords with a demand of the formula (5) that the temperature rise $\Delta T_{dpf}$ of the exhaust gas should be lessened as the air-fuel ratio A/F is increased. Further, as shown in FIG. 4, when the air-fuel ratio A/F is constant, the engine system shown in FIG. 1 satisfies a second feature that the temperature of the filter 28 is decreased with an increase of the load. This second feature accords with another demand of the formula (5) that, as the ratio $E_{trq}/C_{gas}$ is increased, the temperature rise $\Delta T_{dpf}$ of the exhaust gas should be lessened to keep the air-fuel ratio A/F constant.

In this embodiment, each time the ECU 40 receives a required torque from sensors including the sensor 38, the ECU 40 controls the output torque corresponding to the energy $E_{trq}$ so as to follow the required torque. Therefore, in the regeneration control for the filter 28, when the ECU 40 adjusts the air-fuel ratio A/F and the intake air quantity A proportional to the heat capacity $C_{gas}$ according to a required torque each time the ECU 40 receives the required torque, the ECU 40 can control the temperature rise $\Delta T_{dpf}$ of the exhaust gas outputted from the filter 28. That is, the ECU 40 can control the temperature of the filter 28.

More specifically, in this embodiment, an actual air-fuel ratio A/F is controlled to a target value set changeably with an output torque of the engine 10 corresponding to the energy $E_{trq}$ so as to set at least one of an intake air quantity A or an injected fuel quantity F at a constant value. Because the quantity A or F is fixed, another quantity is also fixed so as to satisfy the air-fuel ratio A/F controlled to the target value. Therefore, when at least one of the quantities A and F is adjusted to a constant value so as to set the air-fuel ratio A/F at a target value determined changeably with an output torque of the engine 10, the temperature rise $\Delta T_{dpf}$ of the exhaust gas can be controlled to a constant value. That is, the temperature of the filter 28 can be controlled to a target value appropriate to the regeneration of the filter 28. Further, in a case where actual fuel injection characteristics of the valves 24 are shifted from the designed fuel injection characteristics so as to excessively or insufficiently heighten the temperature of the filter 28 in the regeneration control, the temperature of the filter 28 can be adequately controlled to the target value because the air-fuel ratio A/F is controlled to an adequate target value.

Figure 5:
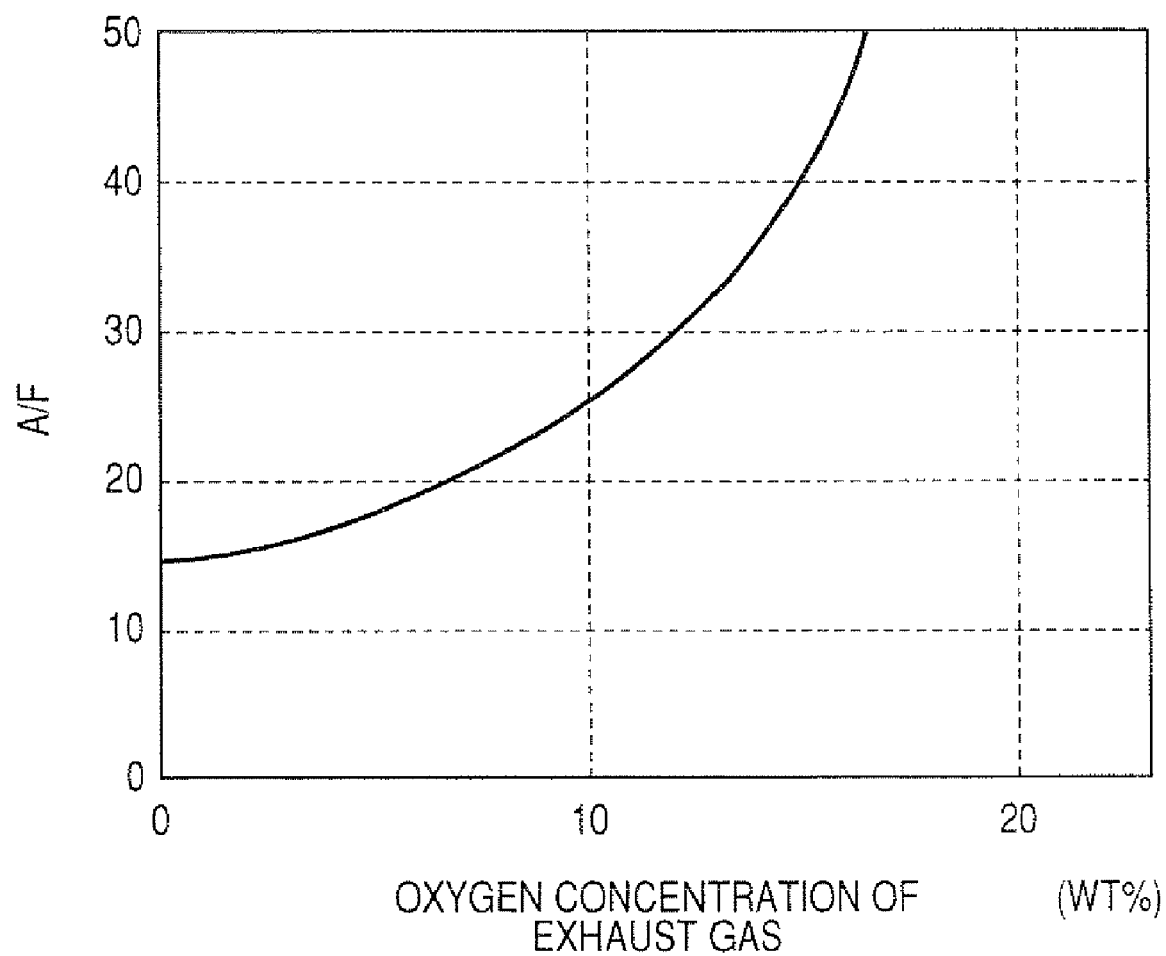
FIG. 5 shows a relation between an oxygen concentration of an exhaust gas and an air-fuel ratio of the engine.

A relation between an oxygen concentration of the exhaust gas and the air-fuel ratio A/F is described with reference to FIG. 5. As shown in FIG. 5 an oxygen concentration of the exhaust gas correlates with the air-fuel ratio A/F. Therefore, when the ECU 40 controls an oxygen concentration of the exhaust gas, the ECU 40 can indirectly control the air-fuel ratio A/F. In this embodiment, the ECU 40 performs a feedback control to control an oxygen concentration of the exhaust gas detected by the sensor 30 to a target value, so that the ECU 40 indirectly performs a feedback control to control an actual air-fuel ratio A/F to a target value.

Further, a heat capacity of the filter 28 is large. Therefore, when the temperature of the filter 28 is rapidly heightened due to the after-injection INa (see FIG. 3) in the start of the regeneration control, an increase of the temperature of the exhaust gas outputted from the filter 28 is considerably delayed as compared with an increase of the temperature of the filter 28. In contrast, when the regeneration control is started, an oxygen concentration of the exhaust gas detected by the sensor 30 is quickly decreased due to the after-injection INa and the post-injections (see FIG. 3). Therefore, an oxygen concentration of the exhaust gas can be controlled to a target value at a quick response. That is, when an oxygen concentration of the exhaust gas is controlled to a target value, an actual air-fuel ratio A/F can be quickly controlled to a target value.

Figure 6:
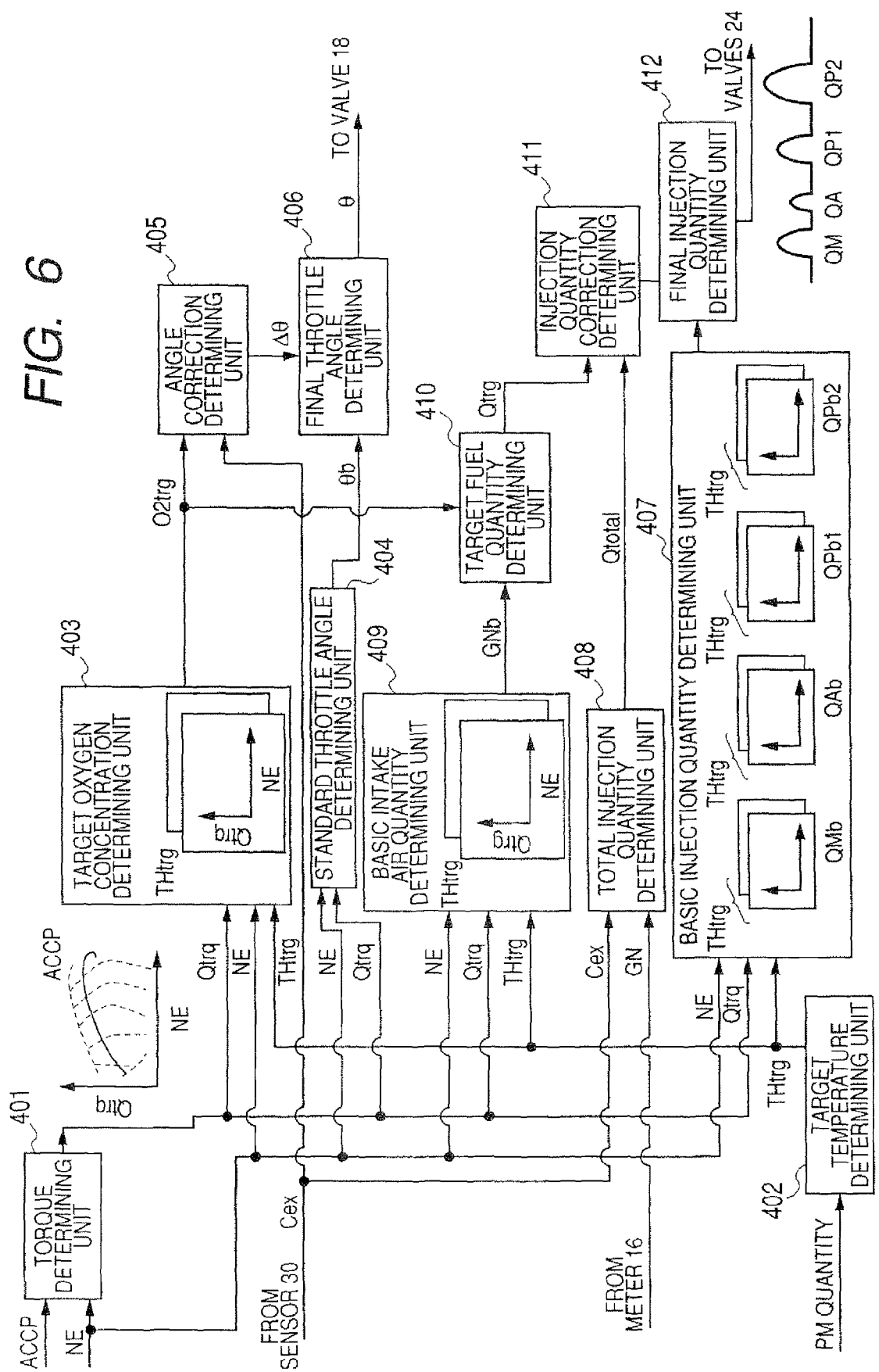
FIG. 6 is a block diagram of an ECU of the engine system shown in FIG. 1 according to embodiments of the present invention.

The regeneration control performed in the ECU 40 is now described with reference to FIG. 6. FIG. 6 is a block diagram of the ECU 40 performing the regeneration control according to the first embodiment.

As shown in FIG. 6, the ECU 40 has a torque determining unit 401 for determining a quantized torque Qtrq corresponding to a required torque, a target temperature determining unit 402 for determining a target temperature THtrg of the filter 28, a target oxygen concentration determining unit 403 for determining a target oxygen concentration (i.e., target air-fuel ratio A/F) O2trg of the exhaust gas outputted from the filter 28, a standard throttle angle determining unit 404 for determining a standard throttle angle θb of the throttle valve 18, an angle correction determining unit 405 for determining a correction of the standard throttle angle, a final throttle angle determining unit 406 for determining a final throttle angle θ of the throttle valve 18, a basic injection quantity determining unit 407 for determining basic quantities QM, QA, QP1 and QP2 in a multi-stage fuel injection (see FIG. 3) performed every stroke of a crank shaft, a total injection quantity determining unit 408 for determining the total Qtotal of quantities of fuel actually injected in the multi-stage fuel injection, a basic intake air quantity determining unit 409 for determining a quantity GNb of the intake air required to obtain the target oxygen concentration when the valves 24 inject the basic quantities of fuel, a target fuel quantity determining unit 410 for determining a target value Qtrg of the fuel equal to the total of the basic quantities, an injection quantity correction determining unit 411 for determining a correction of the actual fuel quantity in each of the fuel injections performed every stroke of a crank shaft, and a final injection quantity determining unit 412 for determining a final quantity of the fuel in each of the fuel injections.

The unit 401 determines a quantized torque Qtrq from a required torque and an engine speed NE. The required torque corresponds to a stroke position ACCP of an accelerator pedal operated by a driver. The torque Qtrq denotes a physical value of a sum of the required torque and a friction loss of energy in the engine 10. The friction loss of energy in the engine 10 is increased with an increase of the engine speed NE. Therefore, in addition to a quantity of fuel required to generate the required torque, the engine 10 additionally requires a quantity of fuel compensating the friction loss. Therefore, in addition to the required torque, the torque Qtrq is set according to the engine speed NE not indicated in the formula (5). A technique for calculating the physical value of the required torque is arbitrary. In this embodiment, the torque Qtrq determines a fuel injection quantity in a normal operation in which the whole injected fuel is used to generate an output torque of the engine 10 corresponding to the required torque without a regeneration control.

The unit 402 determines a target temperature value (i.e., target temperature THtrg) of the filter 28 from a quantity of the particulate matters PM deposited in the filter 28. A quantity of the deposited particulate matters is estimated according to a well-known technique. The target temperature THtrg can arbitrarily be set according to a request in the regeneration control. In this embodiment, a combustion speed of the particulate matters is heightened with the increase of a quantity of the particulate matters. Therefore, as the quantity of the deposited particulate matters is increased, the target temperature THtrg is lowered.

The unit 403 determines a target oxygen concentration value (i.e., target oxygen concentration O2trg) of the exhaust gas outputted from the filter 28. The concentration O2trg should be determined such that the temperature of the filter 28 approaches the target temperature THtrg in operation conditions of the engine 10. The concentration O2trg corresponds to a target air-fuel ratio at which the filter 28 approaches the target temperature THtrg. In consideration of the formula (5), as parameters of the operation conditions of the engine 10, an output torque in the fuel injection, a displacement (i.e., exhausted gas quantity) and parameters correlating with the torque and/or the displacement are preferable. In this embodiment, as parameters of the operation conditions of the engine 10, the quantized torque Qtrq and the engine speed NE are adopted. The unit 403 determines the target oxygen concentration O2trg of the exhaust gas from the target temperature THtrg, the torque Qtrq and the engine speed NE such that the temperature of the filter 28 approaches the target temperature THtrg when the engine 10 is operated at both the torque Qtrq and the engine speed NE. In the unit 403, a two-dimensional map of the concentration O2trg changing with both the torque Qtrq and the engine speed NE is prepared for each of upper and lower limits of the target temperature THtrg. The upper limit of the target temperature THtrg is set at 700° C. The lower limit of the target temperature THtrg is set at 500° C. The concentration O2trg is determined by using these maps. Therefore, each time the ECU 40 receives the torque Qtrq and the engine speed NE, the unit 403 sets the concentration O2trg changing with the torque Qtrq and the engine speed NE while considering the target temperature THtrg.

The unit 404 determines a standard throttle angle θb of the throttle valve 18 from the quantized torque Qtrq and the engine speed NE representing the operation conditions of the engine 10. The valve 18 set at the angle θb supplies air to the engine 10 by an air quantity A appropriate to the regeneration control when the engine 10 is set in the operation conditions. The operation conditions (torque Qtrq and engine speed NE) of the engine 10 used to determine the angle θb are also used to determine the target oxygen concentration O2trg. As described later, the operation conditions of the engine 10 are also used to determine basic quantities of the fuel in the multi-stage injection shown in FIG. 3. Therefore, the angle θb is associated with the concentration O2trg and the basic quantities in the fuel injections performed for the regeneration control. More specifically, assuming that the basic quantities of fuel are supplied to the engine 10 according to the designed fuel injection characteristics while air is supplied to the engine 10 through the valve 18 set at the angle θb, the concentration O2trg is obtained, and the filter 28 is regenerated at the target temperature THtrg. In the regeneration control, the unit 404 sets the angle θb as a controlled variable in a feed forward control such that the oxygen concentration of the exhaust gas approaches the target oxygen concentration O2trg.

The unit 405 determines a correction (i.e., throttle angle correction Δθ) of the standard throttle angle θb of the throttle valve 18 from a difference O2error (=O2trg−Cex) between an actual oxygen concentration Cex of the exhaust gas detected by the sensor 30 and the target oxygen concentration O2trg.

The unit 405 sets the correction Δθ as a controlled value or variable in a feedback control such that the actual oxygen concentration Cex approaches the target oxygen concentration O2trg. A technique for calculating the correction Δθ is arbitrary. For example, to use the correction Δθ for a parallel integration control, a parallel coefficient KPO and a plurality of integration coefficients KIOi are prepared in advance, and the correction Δθ is calculated according to a following formula: Δθ=KPO×O2error+ΣKIOi×O2error.

The unit 406 determines a sum of the standard throttle angle θb and the throttle angle correction Δθ as a final throttle angle θ of the throttle valve 18. The ECU controls the valve 18 to be set at the angle θ.

The unit 407 determines basic quantities of fuel in the multi-stage fuel injection (see FIG. 3) performed in the regeneration control. More specifically, the unit 407 determines a basic quantity QMb of the main injection INm, a basic quantity QAb of the after injection INa, a basic quantity QP1$b$ of the first post-injection IN1$p$, and a basic quantity QP2$b$ of the second post-injection IN2$p$ from the target temperature THtrg, the quantized torque Qtrq and the engine speed NE. The same operation conditions of the engine 10 used to determine these basic fuel quantities QMb, QAb, QP1$b$ and QP2$b$ are the same as those used for the standard throttle angle θb and the target oxygen concentration O2trg. Therefore, the basic fuel quantities are associated with the standard throttle angle θb and the target oxygen concentration O2trg. The basic fuel quantities are parameters of a feed forward control to control the temperature of the filter 28 to the target temperature THtrg, to control an output torque to a required torque, and to control the actual oxygen concentration Cex of the exhaust gas to the target oxygen concentration O2trg. In the unit 407, a two-dimensional map of each basic fuel quantity changing with both the torque Qtrq and the engine speed NE is prepared for each of the upper and lower limits (700° C. and 500° C.) of the target temperature THtrg. Therefore, the unit 407 sets each of the basic fuel quantities QMb, QAb, QP1$b$ and QP2$b$ changing with the torque Qtrq and the engine speed NE while considering the target temperature THtrg.

In the actual regeneration control, in addition to the basic fuel quantities QMb, QAb, QP1$b$ and QP2$b$, it is necessary to set an injection start time of each fuel injection to control an output torque to a required torque and to control the temperature of the filter 28 to the target temperature THtrg. These injection start times are adjusted in advance.

The unit 408 determines the total (i.e., actual total injection quantity Qtotal) of quantities of the fuel actually injected into the chambers 20 in the main injection INm, the after-injection INa and the post-injections IN1$p$ and IN2$p$ from the actual oxygen concentration Cex detected by the oxygen concentration sensor 30 and an actual quantity GN (mg per combustion cycle) of the intake air detected by the air flow meter 16. The concentration Cex is expressed according to a formula (6).

$$Cex=(GN/1000\times Kair/0.9\times 1/100-Df\times Qtotal\times Kcon)/(Df\times Qtotal+GN/1000) \quad (6)$$

In this formula, the concentration Cex is indicated by weight percent, and the quantity Qtotal is indicated by volume. The coefficient Kair denotes an oxygen volume concentration (%), and the value of 0.9 is a constant for converting volume to weight. The symbol Df denotes a density (g/mm$^3$) of fuel, and the coefficient Kcon denotes a weight of oxygen consumed per unit fuel. The first term of the numerator indicates a quantity of the oxygen in the intake air, and the second term of the numerator indicates a quantity of the oxygen consumed when the whole fuel injected into the engine 10 is oxidized. Therefore, the numerator indicates a quantity of the oxygen in the exhaust gas. The denominator indicates the total quantity of the exhaust gas.

The formula (6) can be rewritten to a formula (7).

$$Q\text{total}=GN/1000\times(Kair/0.9-Cex)/(Kcon\times100+Cex)\times1/Df \quad (7)$$

The quantity Qtotal is calculated according to the formula (7).

The unit 409 determines a basic quantity (i.e., basic intake air quantity GNb) of the intake air. Assuming that the fuel set at the base quantities QMb, Qab, IN1$p$ and IN2$p$ is injected into the engine 10 set in certain operation conditions, intake air set at the quantity GNb is required to obtain the exhaust gas set at the target oxygen concentration O2trg and to regenerate the filter 28 at the target temperature THtrg. This quantity GNb is preferably determined from parameters of the operation conditions used to determine the base quantities QMb, Qab, IN1$p$ and IN2$p$ in the unit 407. Therefore, the unit 409 determines the basic quantity GNb of the intake air from the quantized torque Qtrq, the target temperature THtrg and the engine speed NE. In the unit 409, a two-dimensional map of the quantity GNb changing with both the torque Qtrq and the engine speed NE is prepared for each of the upper and lower limits (700° C. and 500° C.) of the target temperature THtrg. The quantity GNb is determined by using these maps. Therefore, the unit 409 sets the quantity GNb changing with the torque Qtrq and the engine speed NE while considering the target temperature THtrg.

The unit 410 determines a target value (i.e., a target total injection quantity Qtrg) of the total of the base quantities QMb, Qab, IN1$p$ and IN2$p$ from the target oxygen concentration O2trg and the basic intake air quantity GNb. The quantity Qtrg is calculated according to a formula (8) in the same manner as the calculation of the quantity Qtotal.

$$Q\text{trg}=GNb/1000\times(Kair/0.9-O2trg)/(Kcon\times100+O2trg)\times1/Df \quad (8)$$

The unit 411 determines a correction of the actual fuel quantity in each of the main injection INm, the after-injection INa, the first post-injection IN1$p$ and the second post-injection IN2$p$ from the target total injection quantity Qtrg and the actual total injection quantity Qtotal. When actual fuel injection characteristics of the valves 24 are shifted from the designed fuel injection characteristics, the quantity Qtrg is differentiated from the quantity Qtotal. The unit 411 sets the corrections as injected fuel quantities to be corrected in a feedback control such that the quantity Qtotal approaches the quantity Qtrg. A technique for calculating the corrections is arbitrary. For example, to use the corrections for a parallel integration control, a parallel coefficient KPQ and a plurality of integration coefficients KIQi are prepared in advance, and a difference Qerror=Qtotal−Qtrg between quantities Qtotal and Qtrg is calculated. A total correction value QFB is calculated according to a following formula: QFB=KPQ×Qerror+ΣKIQi×Qerror. The total correction value QFB is equally divided into four correction values QFB/4, and a correction of each injection in the multi-stage fuel injection is set at the divided correction value QFB/4.

The unit 412 determines final quantities QM, QA, QP1 and QP2 of the fuel in the multi-stage fuel injection from the basic fuel quantities QMb, QAb, QP1$b$ and QP2$b$ and the corrections of the actual quantities. More specifically, the correction value QFB/4 of the unit 411 is added to each of the basic fuel quantities QMb, QAb, QP1$b$ and QP2$b$ to determine final quantities of the fuel in the main injection INm, the after-injection INa, the first post-injection IN1$p$ and the second post-injection IN2$p$. The ECU 40 controls the valves 24 to inject the final quantities of fuel every stroke of a crank shaft.

Figure 7:
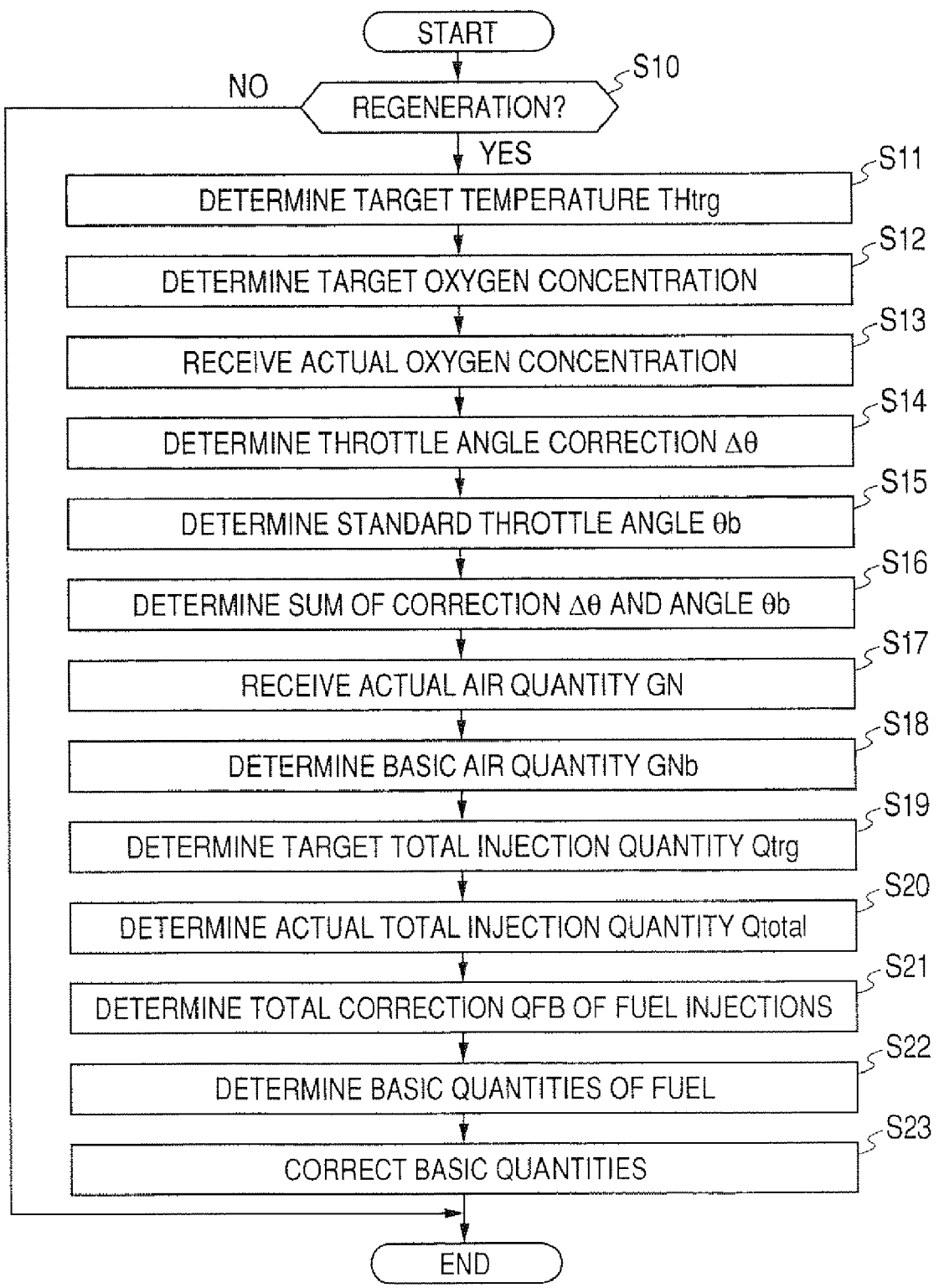
FIG. 7 shows a processing procedure of the regeneration control for the filter according to the first embodiment.

The processing of the regeneration control performed in the ECU 40 is described with reference to FIG. 7. FIG. 7 shows a processing procedure of the regeneration control for the filter 28 according to the first embodiment. This processing is repeatedly performed in a predetermined cycle.

As shown in FIG. 7, at step S10, the ECU 40 judges whether or not the filter 28 is under regeneration control. In case of negative judgment, this processing is ended. In contrast, in case of affirmative judgment, the unit 402 determines a target temperature THtrg (step S11). At step S12, the unit 403 determines a target oxygen concentration O2trg. At step S13, the ECU 40 receives an actual oxygen concentration Cex from the sensor 30. At step S14, the unit 405 determines a throttle angle correction Δθ from a difference between the concentrations Cex and O2trg. At step S15, the unit 404 determines a standard throttle angle θb of the throttle valve 18. At step S16, the unit 406 determines the sum of the correction Δθ and the angle θb as a final throttle angle θ. At step S17, the unit 408 receives an actual quantity GN of the intake air detected by the meter 16. At step S18, the unit 409 determines a basic intake air quantity GNb. At step S19, the unit 410 determines a target total injection quantity Qtrg. At step S20, the unit 408 determines an actual total injection quantity Qtotal. At step S21, the unit 411 determines a total correction QFB of fuel injections in the multi-stage fuel injection to control the quantity Qtotal to the quantity Qtrg in a feedback control according to the correction QFB. At step S22, the unit 407 determines basic quantities QMb, QAb, QP1$b$ and QP2$b$ of fuel in the multi-stage fuel injection. At step S23, the unit 411 corrects the basic quantities QMb, QAb, QP1$b$ and QP2$b$ on the basis of the total correction QFB to the final quantities QM, QA, QP1 and QP2. Then, the valve 18 is set at the angle θ, the valves 24 are set to inject the final quantities of fuel every stroke of a crank shaft, and this procedure is completed.

Figure 8:
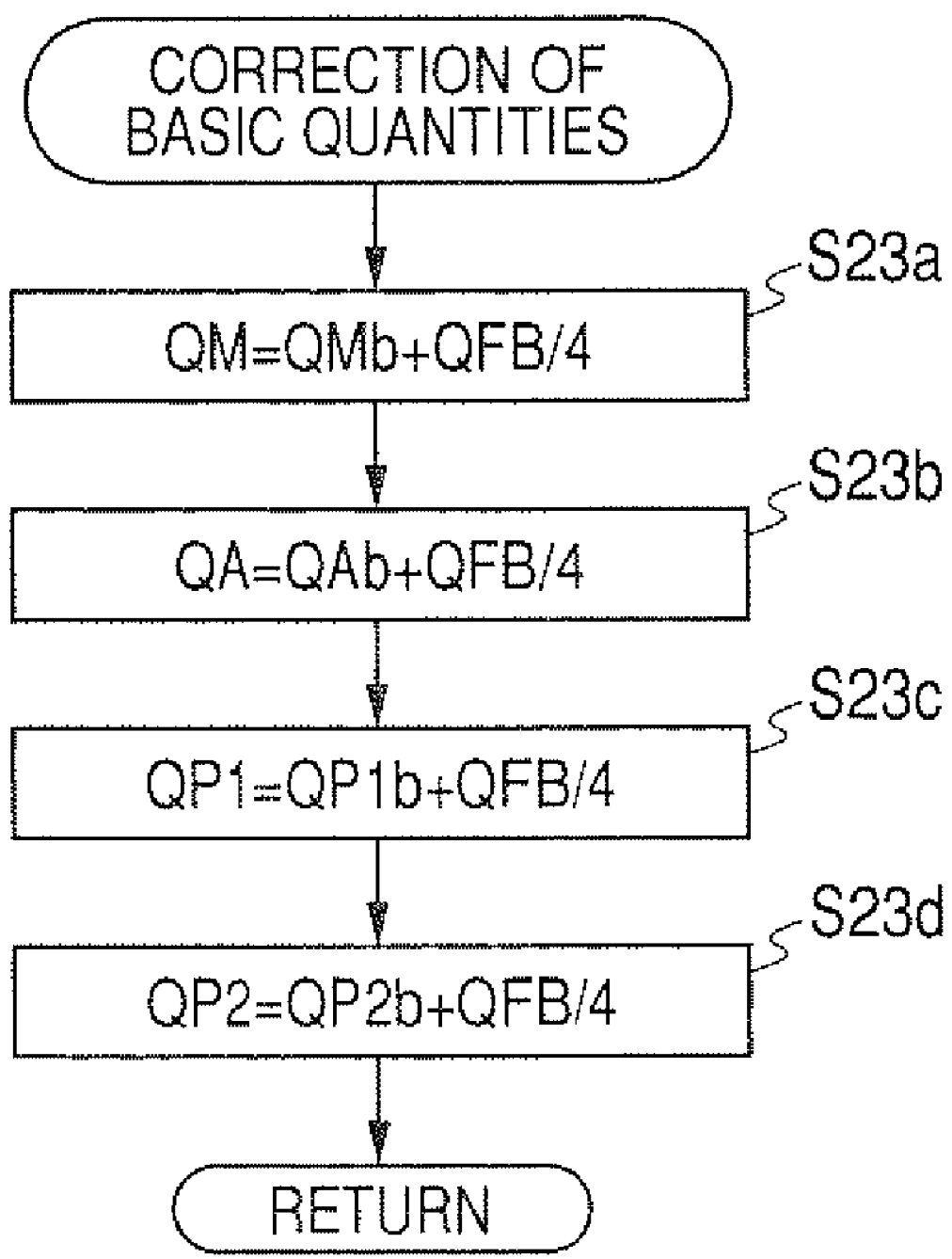
FIG. 8 shows a processing procedure for calculating corrections of basic quantities of fuel in the regeneration control.

The correction of the actual fuel quantities at step S23 is described in more detail with reference to FIG. 8. FIG. 8 shows a processing procedure for calculating the correction values of the actual fuel quantities in the regeneration control. As shown in FIG. 8, at step S23$a$, a quarter of the total correction QFB is added to the basic quantity QMb to obtain a final quantity QM of the main injection INm. At step S23$b$, a quarter of the total correction QFB is added to the basic quantity QAb to obtain a final quantity QA of the after-injection INa. At step S23$c$, a quarter of the total correction QFB is added to the basic quantity QP1$b$ to obtain a final quantity QP1 of the first after injection IN1$p$. At step S23$d$, a quarter of the total correction QFB is added to the basic quantity QP2$b$ to obtain a final quantity QP1 of the second after-injection IN2$p$.

Therefore, when the regeneration control is started, the actual oxygen concentration Cex of the exhaust gas is detected by the sensor 30, the ECU 40 determines the target oxygen concentration O2trg according to the engine speed NE and the quantized torque Qtrq representing the operational conditions of the engine 10 while considering the target temperature THtrg of the filter 28, and the ECU 40 performs a feedback control for the engine 10 such that the concentration Cex is controlled to the target oxygen concentration O2trg.

Further, in the regeneration control, fuel is additionally injected into the chambers 20 by the after-injection Ina and the post-injections INp1 and INp2 every stroke of a crank shaft. Therefore, the temperature of the filter 28 is rapidly heightened. In a case where actual injection characteristics of the valves 24 are shifted or differentiated from the designed injection characteristics estimated when the basic fuel quantities in the post-injections are determined, the valves 24 inject actual fuel quantities of fuel larger than the basic quantities QP1*b* and QP2*b* in response to an injection instruction of the ECU 40 which intends to instruct the valves 24 to inject the basic quantities QP1*b* and QP2*b* according to the determination in the unit 407. Therefore, fuel is, for example, excessively injected in the post-injections such that the temperature of the filter 28 intends to exceed the target value THtrg.

Figure 9:
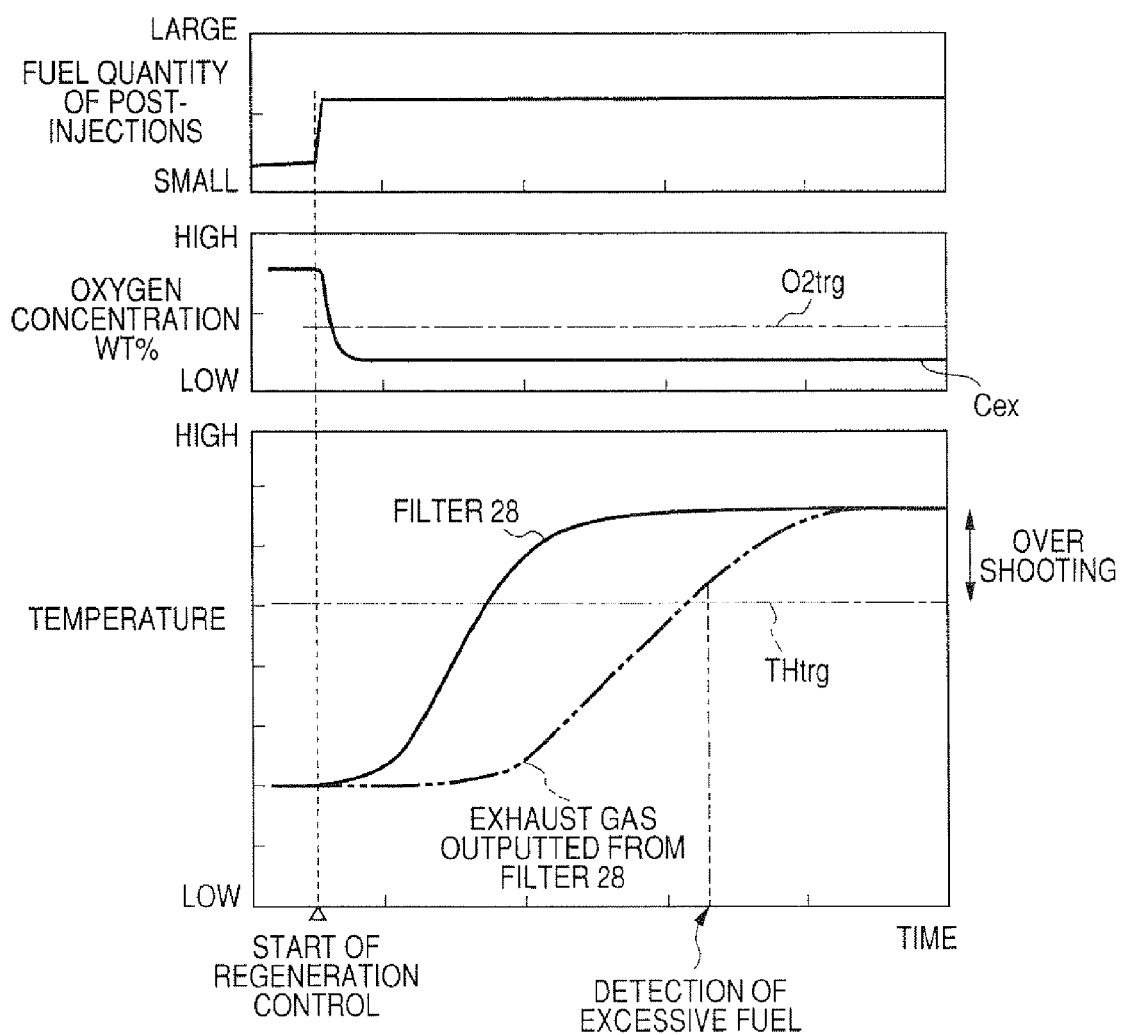
FIG. 9 shows a regeneration control based on temperature of an exhaust gas outputted from the filter as a compared example.

Assuming that the temperature of the filter 28 is controlled based on the temperature of the exhaust gas outputted from the filter 28, the filter 28 easily exceeds the target temperature THtrg because of a delayed response caused by a large heat capacity of the filter 28. FIG. 9 shows a regeneration control based on the temperature of the exhaust gas outputted from the filter 28 as a compared example. As shown in FIG. 9, when the regeneration control is started, the temperature of the filter 28 is rapidly increased, while the temperature of the exhaust gas outputted from the filter 28 is gradually increased so as to be delayed from an increase of the temperature of the filter 28. Therefore, a detection of an excessive fuel injection is considerably delayed until the temperature of the exhaust gas exceeds the target temperature THtrg, and fuel quantities of the post-injections are reduced after the delayed detection. As a result, the temperature of the filter 28 is undesirably heightened for a long time in a transitional state to the regeneration operation so as to exceed the target temperature THtrg. In this case, the actual oxygen concentration Cex quickly becomes lower than the target oxygen concentration O2trg and stably maintains a low value.

Figure 10:
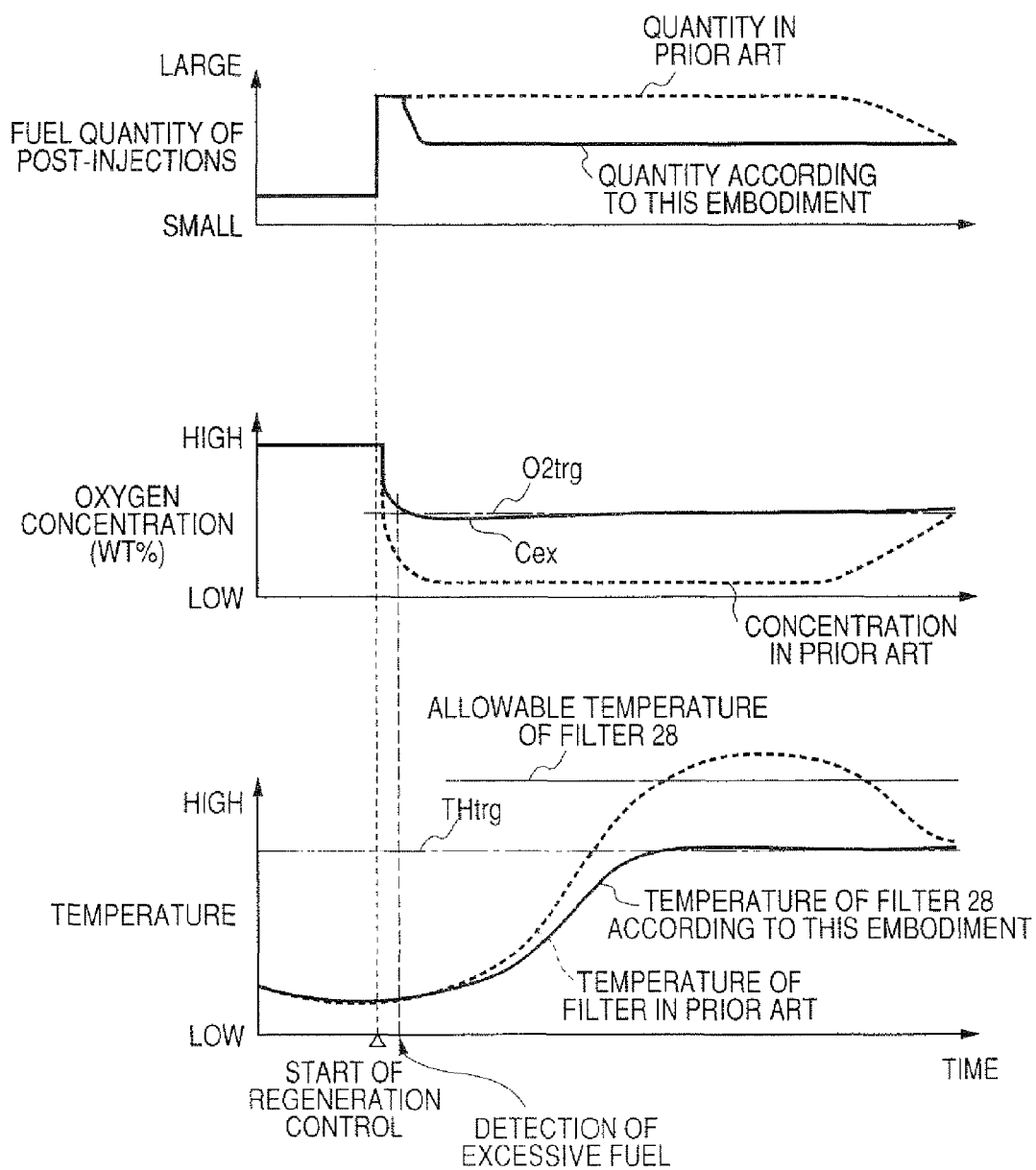
FIG. 10 shows a regeneration control based on an actual oxygen concentration according to the first embodiment.

In contrast, in this embodiment, when the BCU 40 starts the regeneration control, the actual oxygen concentration Cex of the exhaust gas is quickly decreased and detected by the sensor 30, in response to an increase of the injected fuel. The ECU 40 performs a feedback control for the valves 18 and 34 such that the concentration Cex approaches the concentration O2trg. FIG. 10 shows a regeneration control based on the actual oxygen concentration Cex according to the first embodiment. As shown in FIG. 10, the ECU 40 quickly detects an excessive fuel injection when the actual oxygen concentration Cex nearly becomes the target oxygen concentration O2trg, and the ECU 40 quickly reduces fuel quantities of the post-injections after the quick detection such that the concentration Cex approaches the concentration O2trg. As a result, the filter 28 quickly approaches the target temperature THtrg. Therefore, even in a case where the valves 24 have actual fuel injection characteristics shifted from the designed fuel injection characteristics so as to excessively inject fuel, the ECU 40 can control the engine 10 such that the concentration Cex quickly approach the concentration O2trg. As a result, the ECU 40 can control the engine 10 such that the temperature of the filter 28 quickly approaches the target temperature THtrg without largely overshooting the target temperature THtrg.

Figure 11A:
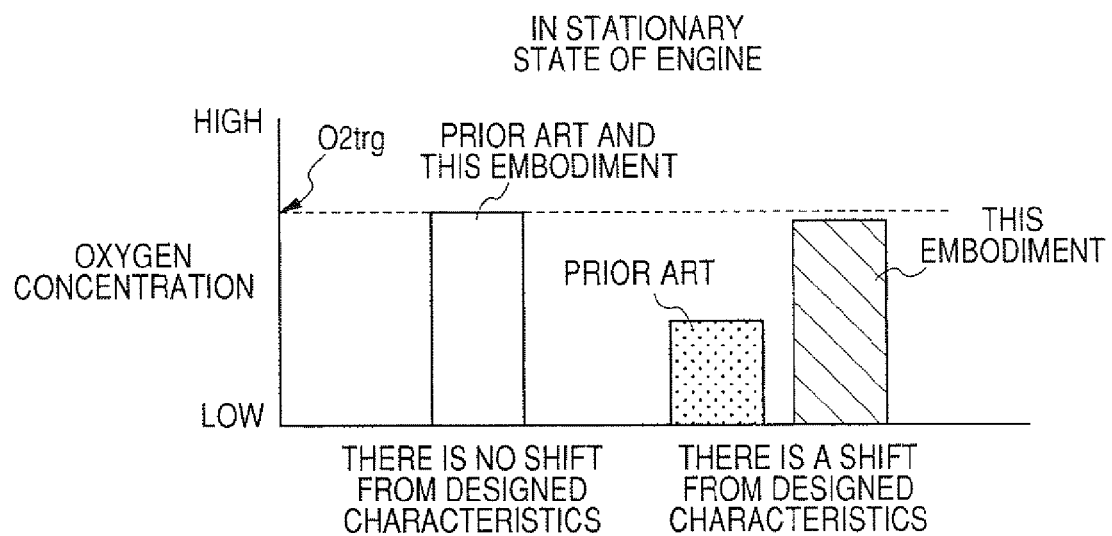
FIG. 11A shows an actual oxygen concentration obtained when the engine reaches a stationary state during the regeneration control.
Figure 11B:
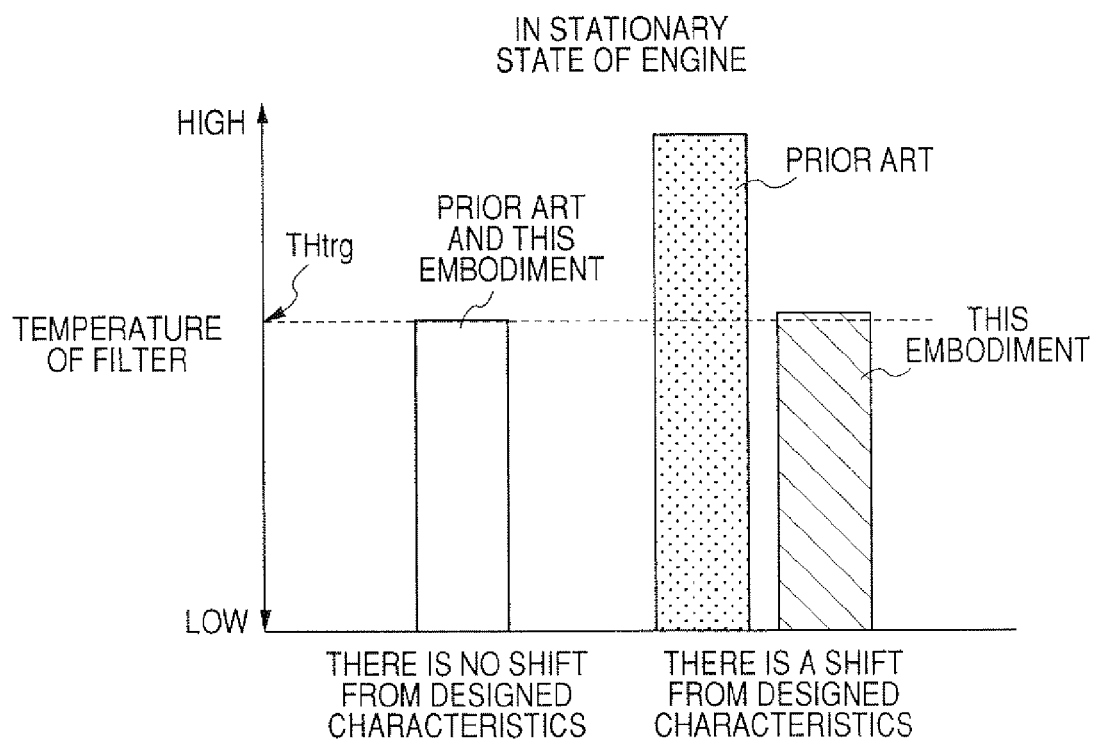
FIG. 11B shows temperature of the filter obtained when the engine reaches a stationary state during the regeneration control.

FIG. 11A shows the actual oxygen concentration Cex obtained when the engine 10 reaches a stationary state during the regeneration control, while FIG. 11B shows the temperature of the filter 28 obtained when the engine 10 reaches a stationary state during the regeneration control.

As shown in FIG. 11A and FIG. 11B, in a case where actual injection characteristics of the valves 24 accord with the designed injection characteristics, the actual oxygen concentration Cex easily reaching the target oxygen concentration O2trg and the temperature of the filter 28 easily reaching the target temperature THtrg are obtained even when the temperature of the filter 28 is controlled based on the temperature of the exhaust gas. In contrast, in a case where actual injection characteristics of the valves 24 are shifted from the designed injection characteristics, controllability for the temperature of the filter 28 deteriorates when the temperature of the filter 28 is controlled based on the temperature of the exhaust gas. However, in this embodiment, because the actual oxygen concentration Cex is feedback-controlled to the concentration O2trg, controllability for the temperature of the filter 28 is excellent even in a case where actual injection characteristics of the valves 24 are shifted from the designed injection characteristics.

The reason that the filter 28 is controlled to the target temperature THtrg is described with consideration of the relation in the formula (5). The ECU 40 sets the target oxygen concentration O2trg and the basic intake air quantity GNb while considering the target temperature THtrg. The ECU 40 sets the target total injection quantity Qtrg from the values O2trg and GNb. Regardless of the actual fuel injection characteristics of the valves 24, the ECU 40 controls the valves 24 to adjust an injected fuel quantity F at the quantity Qtrg (F=Qtrg) corresponding to the target temperature THtrg. The ECU 40 controls the throttle valve 18 such that the actual oxygen concentration Cex is adjusted to the concentration O2trg (i.e., a target air-fuel ratio corresponding to the target temperature THtrg). Because the quantity Qtrg (F=Qtrg) and the target air-fuel ratio are set in the engine 10, an intake air quantity A is adjusted to the quantity GNb (A=GNb) by the valve 18. Therefore, the filter 28 is controlled to the target temperature THtrg Various effects can be obtained in the regeneration control as follows.

The ECU 40 substantially controls an actual air-fuel ratio of the engine 10 represented by the actual oxygen concentration Cex to a target air-fuel ratio represented by the target oxygen concentration O2trg according to a is feedback control. Accordingly, even when actual injection characteristics of the valves 24 are shifted from the designed injection characteristics so as to place the temperature of the filter 28 out of a temperature range appropriate to the regeneration of the filter 28 in a transitional state time of the regeneration operation, the ECU 40 can appropriately control the regeneration of the filter 28 so as to control the temperature of the filter 28 within the appropriate temperature range.

A target air-fuel ratio is set according to the target temperature THtrg of the filter 28, and an actual air-fuel ratio is feedback-controlled to the target air-fuel ratio according to the target temperature THtrg of the filter 28. Accordingly, when the actual air-fuel ratio is feedback-controlled to the target air-fuel ratio, the filter 28 can appropriately be controlled to the target temperature THtrg suitable to the regeneration.

The target air-fuel ratio is determined according to an operation condition of the engine such as a quantized torque $E_{trq}$, in addition to the target temperature THtrg. Therefore, the target air-fuel ratio can be changed with the torque $E_{trq}$. That is, a difference between the term A/F and the term $E_{trq}/C_{gas}$ in the formula (5) can be set constant so as to maintain the term $\Delta T_{dp}/K2$ at a constant value. Accordingly, the filter 28 can reliably be controlled to the target temperature THtrg regardless of a change of the torque $E_{trq}$.

The ECU 40 controls the fuel injection valves 24 to adjust a quantity of the fuel injected into the engine 10. Accordingly, the fuel quantity can be reliably adjusted, so that the air-fuel ratio of the engine 10 can reliably be controlled to the target air-fuel ratio.

The meter 16 detects the actual air quantity GN, the ECU 40 determines the actual fuel quantity Qtotal according to an actual air-fuel ratio and the actual air quantity GN, and the ECU 40 controls the valves 24 according to a difference between the actual fuel quantity Qtotal and the target fuel quantity Qtrg. Accordingly, a quantity of the fuel injected into the engine 10 can be adjusted to the target fuel quantity Qtrg at a high response speed. In contrast, assuming that the ECU 40 directly sets a controlled value according to a parallel term and integration terms based on a difference between the actual air-fuel ratio and the target air-fuel ratio, the setting of a large gain is impossible to avoid overshooting of the actual fuel quantity Qtotal from the target fuel quantity Qtrg. Therefore, a speed of response to the target quantity Qtrg is largely lowered.

The target temperature THtrg of the filter 28 is set according to particulate matters of the filter 28, and the target fuel quantity Qtrg is set according to the target temperature THtrg. Accordingly, the ECU 40 can appropriately set the target fuel quantity Qtrg so as to control the filter 28 to the target temperature THtrg.

The ECU 40 sets a correction for a quantity of the fuel actually injected according to a difference between the actual total fuel quantity Qtotal and the target fuel quantity Qtrg, and the ECU 40 controls the valves 40 to adjust a fuel quantity used as a controlled variable by the correction such that the actual total fuel quantity Qtotal is controlled to the target fuel quantity Qtrg according to a feed forward control. Accordingly, the temperature of the filter 28 can appropriately controlled according to a simplified control. In contrast, assuming that the actual fuel quantity Qtotal is feedback controlled to the target quantity Qtrg so as to control an actual air-fuel ratio to a target air-fuel ratio, it is difficult to control the filter 28 to the target temperature THtrg.

The basic air quantity GNb is set according to the target temperature THtrg of the filter 28 and an operation condition of the engine 10 such as a quantized torque Qtrq, and the target fuel quantity Qtrg is set according to the basic air quantity GNb and the target air-fuel ratio, and a quantity of the fuel supplied to the engine 10 is adjusted to the target fuel quantity Qtrg. Therefore, even when the quantity of the fuel injected into the engine 10 is differentiated from the target quantity Qtrg, the fuel quantity can be adjusted to the target quantity Qtrg, and the air quantity is adjusted to the basic intake air quantity GNb while satisfying the target air-fuel ratio. Accordingly, the ECU 40 can further reliably control the regeneration of the filter 28.

The ECU 40 feedback-controls the throttle valve 18 to adjust a quantity of the air taken in the engine 10. To compensate a difference between an actual temperature and a target temperature in the filter 28 caused by a difference between actual injection characteristics and the designed injection characteristics, it is desired to lessen a change in the output torque of the engine 10. When the throttle valve 18 adjusts an air quantity, a change in the output torque is low. Therefore, a large gain can be set in the feedback control. Accordingly, an actual air-fuel ratio can be feedback-controlled to a target air-fuel ratio at a high response. In contrast, assuming that the valves 24 adjusts a fuel quantity to compensate a difference between an actual temperature and a target temperature in the filter 28, a change in the output torque becomes large. Therefore, a large gain cannot be set in the feedback control. As a result, when a fuel quantity is changed, a feedback control to a target air-fuel ratio becomes a slow response.

The ECU 40 sets the target temperature THtrg of the filter 28, sets the target air-fuel ratio of the exhaust gas according to the target temperature THtrg and an operation condition of the engine 10, and sets a correction value for a quantity of the air adjusted by the throttle valve 18 according to a difference between the actual air-fuel ratio and the target air-fuel ratio. Then, the ECU 40 controls the throttle valve 18 to adjust an air quantity by the correction value such that the actual air-fuel ratio is controlled to the target air-fuel ratio according to a feed forward control. Accordingly a response in the feed forward control can be heightened.

The ECU 40 controls the actual oxygen concentration Cex to the target oxygen concentration O2trg in a feedback control to indirectly control an actual air-fuel ratio to a target air-fuel ratio. Accordingly, because the actual oxygen concentration Cex is quickly changed in response to a change of an actual air-fuel ratio, the temperature of the filter 20 can be adjusted so as to quickly reach the target temperature THtrg without any overshooting.

Embodiment 2

In the first embodiment, the ECU 40 adjusts both the quantities A and F. However, the ECU 40 may adjust only one quantity A or F to control an air-fuel ratio to a target value and to control the temperature of the filter 28 to a target value adequate to the regeneration of the filter 28. In the second embodiment, when the ECU 40 controls an actual oxygen concentration Cex to a target oxygen concentration O2trg in a feedback control to control an air-fuel ratio to a target value, the ECU 40 determines a controlled variable or a parameter in the feedback control according to a load on the engine 10 to adjust only one of an intake air quantity A and an injected fuel quantity F.

In a high load operation of the engine 10, when a quantity of the fuel injected into the engine 10 is changed, a change of the term "Etrq/Cgas" in the formula (5) is small. Therefore, assuming that a fuel quantity is used as a controlled variable in the feedback control, a response speed in the feedback control becomes low. To heighten a response speed in the feedback control, it is preferred to use a throttle angle of the throttle valve 18 as a controlled variable. In contrast, in a low load operation of the engine 10, when a quantity of the fuel injected into the engine 10 is changed, a response speed in the feedback control becomes high. To heighten a response speed in the feedback control, it is preferred to use an injected fuel quantity as a controlled variable.

Figure 12:
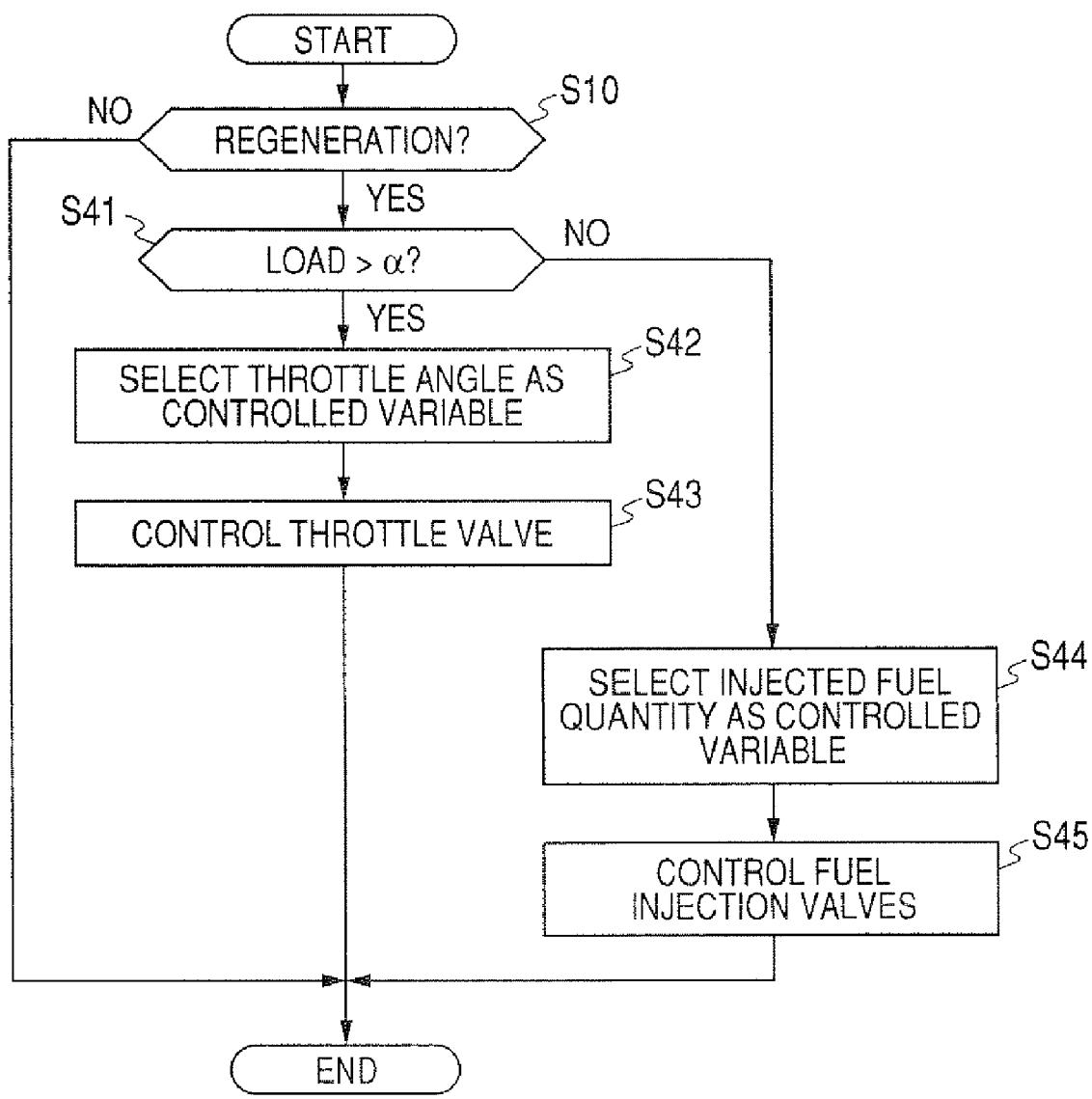
FIG. 12 shows a processing procedure of a regeneration control according to the second embodiment of the present invention.

FIG. 12 shows a processing procedure of the regeneration control for the filter 28 according to the second embodiment. This processing is repeatedly performed in a predetermined cycle. The ECU 40 has a judging unit 41 (see FIG. 1).

As shown in FIG. 12, when the filter 28 is under the regeneration control (step S10), the judging unit 41 of the ECU 40 judges at step S41 whether or not a load on the engine 10 is larger than a threshold value α. When the load is larger than the threshold value α, the procedure proceeds to step S42. At step S42, the ECU 40 selects a throttle angle of the throttle valve 18 as a controlled variable and executes steps S10 to S15 (see FIG. 7). Then, at step S43, the ECU 40 controls the valve 18 to adjust a throttle angle to a final throttle angle θ determined in the unit 406 according to a difference between the concentration Cex of the sensor 30 and the concentration O2trg of the unit 403 (see FIG. 6). Therefore, the concentration Cex is controlled to the concentration O2trg in a feedback control so as to control an air-fuel ratio of the engine 10 to a target value, and the procedure is completed.

In contrast, in case of the negative judgment at step S41, the procedure proceeds to step S44. At step S44, the ECU 40 selects an injected fuel quantity as a controlled variable and executes steps S10, S1, S12, S13, S17, S18, S19, S20, S21, S22 and S23 (see FIG. 7). Then, at step S45, the ECU 40 controls the valves 24 to adjust the injected fuel at final quantities QM, QA, QP1 and QP2 determined in the unit 412. Therefore, the concentration Cex is feedback-controlled to the concentration O2trg so as to control an air-fuel ratio of the engine 10 to a target value, and the procedure is completed.

As a parameter indicating the load on the engine 10, a stroke position of an accelerator pedal operated by a driver is used. In place of the stroke position, the quantized torque Qtrq may be used.

Further, a friction loss of energy in the engine 10 is increased with an increase of the engine speed NE, so that the engine 10 requires a quantity of fuel compensating the friction loss, in addition to a quantity of fuel required to generate the torque Qtrq. Therefore, because the load on the engine 10 includes a load caused by the friction loss, the threshold value $\alpha$ is set so as to be changed with the engine speed NE.

Accordingly, because a controlled variable in a feedback control for controlling the actual oxygen concentration Cex to the target oxygen concentration O2trg is set to a throttle angle of the throttle valve 18 or an injected fuel quantity according to a load on the engine 10, a controlled variable appropriate to the feedback control can be used so as to heighten a response speed in the feedback control.

Further, when the engine 10 is operated in a high load, the air quantity A is adjusted so as to set an actual air-fuel ratio A/F at a target air-fuel ratio. Accordingly, in consideration of the formula (5), because the ratio A/F and the quantity A are adjusted, the temperature of the filter 28 can be controlled to a constant value adequate to the regeneration of the filter 28.

In the same manner, when the engine 10 is operated in a low load, the fuel quantity F is adjusted so as to set an actual air-fuel ratio A/F at a target air-fuel ratio. Because the ratio A/F and the quantity F are adjusted, the air quantity A is automatically adjusted. Accordingly, in consideration of the formula (5), the filter 28 can be controlled to a constant value adequate to the regeneration of the filter 28. Particularly, when the quantity F is adjusted to the target total injection quantity Qtrg corresponding to the target temperature THtrg of the filter 28, the filter 28 can be controlled to the target temperature THtrg.

In this embodiment, when a load on the engine 10 is not larger than the threshold value $\alpha$, the final quantities of the fuel are determined. However, the ECU 40 may control the valves 24 according to a difference between the oxygen concentrations Cex and O2trg such that the concentration Cex is controlled to the concentration O2trg.

Embodiment 3

When an injected fuel quantity is changed, an output torque of the engine 10 is changed. Therefore, when an injected fuel quantity is used as a controlled variable in a feedback control of the regeneration control for controlling the actual oxygen concentration Cex to the target oxygen concentration O2trg, a gain for a change in an injected fuel quantity is restricted to a low value. In contrast, when an intake air quantity is changed, a change in an output torque of the engine 10 is very small. Therefore, a gain for a change in an intake air quantity can be set at a high value. In the third embodiment, to further heighten a response speed in the feedback control as compared with that in the second embodiment, both an injected fuel quantity and a throttle angle of the throttle valve 18 are used as controlled variables in a feedback control in a low load operation of the engine 10.

Figure 13:
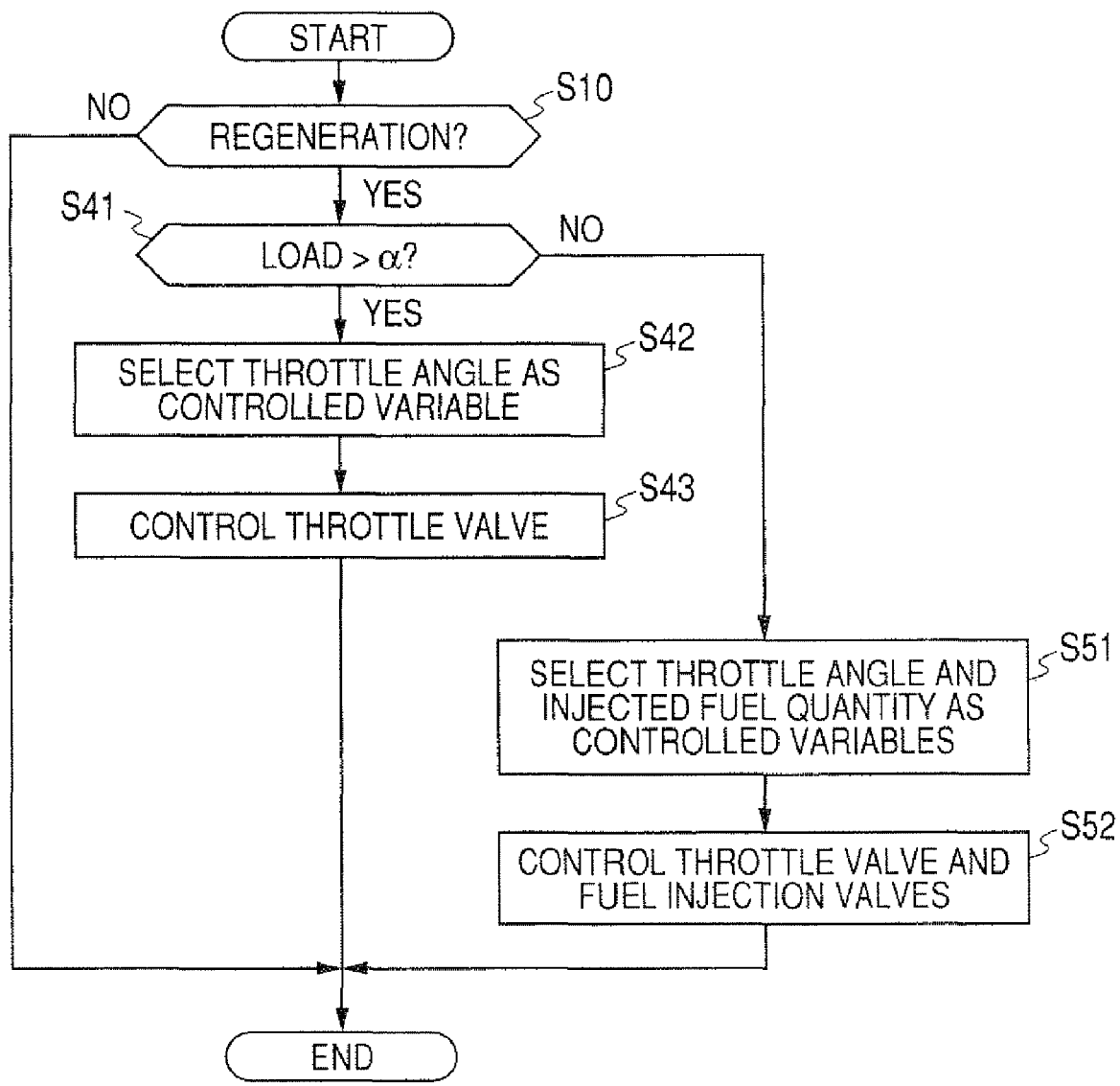
FIG. 13 shows a processing procedure of a regeneration control according to the third embodiment of the present invention.

FIG. 13 shows a processing procedure of the regeneration control for the filter 28 according to the third embodiment. This processing is repeatedly performed in a predetermined cycle.

As shown in FIG. 13, when the filter 28 is under the regeneration control (step S10), the ECU 40 judges at step S41 whether or not a load on the engine 10 is larger than the threshold value $\alpha$. In case of the affirmative judgment, at steps S42 and S43, in the same manner as in the second embodiment, the ECU 40 selects a throttle angle of the throttle valve 18 as a controlled variable and controls the valve 18 to adjust a throttle angle to a final throttle angle $\theta$ according to a difference between the concentrations Cex and O2trg, and the concentration Cex is feedback-controlled to the concentration O2trg.

In contrast, in case of the negative judgment at step S41, the procedure proceeds to step S51. At step S51, the ECU 40 selects a throttle angle of the throttle valve 18 and an injected fuel quantity as controlled variables and executes steps S10 to S23 (see FIG. 7). Then, at step S52 the ECU 40 controls the valve 18 to adjust a throttle angle to a final throttle angle $\theta$ according to a difference between the concentrations Cex and O2trg and controls the valves 24 to adjust the injected fuel at final quantities according to the concentration difference. Therefore, the concentration Cex is feedback-controlled to the concentration O2trg.

Accordingly, because both an injected fuel quantity and a throttle angle of the throttle valve 18 are used as controlled variables in a feedback control in a low load operation of the engine 10, a response speed in the feedback control can further be heightened.

Modifications

In the first embodiment, to determine a difference between the quantities Qtrg and Qtotal with high reliability, the quantity Qtrg is determined from the values GNb and O2trg of the intake air quantity and the oxygen concentration in the same manner as the quantity Qtotal determined from the values GN and Cex of the intake air quantity and the oxygen concentration. However, the quantity Qtrg may be determined from the basic quantities QMb, Qab, QP1$b$ and QP2$b$ of fuel and the engine speed NE.

Further, each of the concentration O2trg of oxygen, the basic intake air quantity GNb of intake air and the basic quantities QMb, Qab, QP1$b$ and QP2$b$ of fuel is determined according to two maps corresponding to two values of the target temperature THtrg. However, three maps or more may be used.

In the second and third embodiments, a controlled variable used for feedback-controlling the concentration Cex to the concentration O2trg is changed based on a load on the engine 10. However, the controlled variable may be set to either a throttle angle of a throttle valve or an injected fuel quantity regardless of a load on the engine 10.

A fuel injection in the regeneration control is not limited to the multi-stage fuel injection shown in FIG. 3. A pilot fuel injection may be added, or the after-injection INa may be removed. Further, a single post-injection may be used. Moreover, an injection start timing of at least one post-injection may be further retarded to further heighten the temperature of the exhaust gas.

The target temperature THtrg of the filter 28 may be fixed. In this case, each of the concentration O2trg of oxygen, the basic intake air quantity GNb and the basic fuel quantities QMb, Qab, QP1$b$ and QP2$b$ is determined while considering the operation conditions of the engine 10 such that the temperature of the filter 28 is appropriately controlled to the target value THtrg.

The filter 28 includes oxygen catalyst. However, oxygen catalyst may be disposed on the upper stream side of the filter 28 not including oxygen catalyst.

In the second and third embodiments, a throttle angle of a throttle valve or an injected fuel quantity is adopted as a controlled variable used for feedback-controlling the concentration Cex to the concentration O2trg. However, the actual quantity GN of the intake air may be used in place of the throttle valve. In this case, the basic intake air quantity GNb may be used in place of the standard throttle angle θb as a controlled variable for a feed forward control.

An air-fuel ratio sensor may be used in place of the oxygen concentration sensor 30. In this case, a target air-fuel ratio is determined in place of the target oxygen concentration O2trg, and the ECU 40 feedback-controls an actual air-fuel ratio detected by the air-fuel ratio sensor to the target air-fuel ratio.

An on-off valve is used as the valve 24. However, as disclosed in U.S. Pat. No. 6,520,423, a valve with a nozzle needle may be used as the valve 24. In this valve, a lift level of the nozzle needle is continuously adjusted to continuously set a fuel injection rate. In case of the valve with a nozzle needle, the equal division of the total correction value QFB is not appropriate as a correction of each fuel injection. Therefore, a correction of each fuel injection should be appropriately set from the total correction value QFB.

A compression ignition engine such as a diesel engine is used as the engine 10. However, a spark ignition engine such as a gasoline engine may be used as the engine 10.

What is claimed is:

1. A control device which controls regeneration of an exhaust emission purifier disposed in an exhaust system of the engine, comprising:
    an air-fuel ratio detecting element that detects an actual air-fuel ratio of a quantity of air supplied to the engine and a quantity of fuel supplied to the engine;
    a target temperature determining unit that determines a target temperature of the exhaust emission purifier in the regeneration of the exhaust emission purifier from an internal condition of the exhaust emission purifier;
    a target air-fuel ratio determining unit that determines a target air-fuel ratio from the target temperature determined by the target temperature determining unit;
    an operating element that supplies the air or the fuel to the engine; and
    an air-fuel ratio controller that controls the actual air-fuel ratio detected by the air-fuel ratio detecting element to the target air-fuel ratio according to a feedback control, by controlling the operating element according to the actual air-fuel ratio and the target air-fuel ratio in the regeneration of the exhaust emission purifier, to control a temperature of the exhaust emission purifier to the target temperature.

2. The control device according to claim 1, wherein the air-fuel ratio controller has a torque determining unit that determines a torque required of the engine, and the target air-fuel ratio determining unit is adapted to determine the target air-fuel ratio from the target temperature and the torque.

3. The control device according to claim 1, wherein the operating element is a fuel valve supplying the fuel to the engine.

4. The control device according to claim 3, further comprising:
    an air quantity detecting element that detects an actual quantity of the air supplied to the engine,
    wherein the air-fuel ratio controller has a fuel injection quantity determining unit that determines an actual quantity of the fuel from the actual air-fuel ratio and the actual quantity of the air detected by the air quantity detecting element, and the air-fuel ratio controller controls the fuel valve according to a difference between the actual quantity of the fuel and a target quantity of the fuel.

5. The control device according to claim 4, wherein the air-fuel ratio controller comprises:
    a target fuel quantity determining unit that determines the target quantity of the fuel from the target temperature, and
    the air-fuel ratio controller controls the fuel valve according to the difference to supply the target quantity of fuel to the engine such that the actual air-fuel ratio is controlled to the target air-fuel ratio to control the temperature of the exhaust emission purifier to the target temperature.

6. A control device which controls regeneration of an exhaust emission purifier disposed in an exhaust system of the engine, comprising:
    an air-fuel ratio detecting element that detects an actual air-fuel ratio of a quantity of air supplied to the engine and a quantity of fuel supplied to the engine;
    an air quantity detecting element that detects an actual quantity of the air supplied to the engine;
    a fuel valve through which the fuel is supplied to the engine;
    a fuel injection quantity determining unit that detects an actual quantity of the fuel, supplied through the fuel valve, from the actual air-fuel ratio and the actual quantity of the air detected by the air quantity detecting element;
    a target temperature determining unit that determines a target temperature of the exhaust emission purifier in the regeneration of the exhaust emission purifier from an internal condition of the exhaust emission purifier;
    a target fuel quantity determining unit that determines a target quantity of the fuel from the target temperature;
    a correction determining unit that determines a correction value for the actual quantity of the fuel from a difference between the actual quantity of the fuel and the target quantity of the fuel; and
    the air-fuel ratio controller that determines a target air-fuel ratio and controls the fuel valve to change the actual quantity of the fuel by the correction value in the regeneration of the exhaust emission purifier such that the actual quantity of the fuel is used as a controlled variable in a feed forward control to control the actual air-fuel ratio to the target air-fuel ratio and to control a temperature of the exhaust emission purifier to the target temperature.

7. The control device according to claim 4, wherein the air-fuel ratio controller comprises:
    a torque determining unit that determines a torque required of the engine;
    a basic air quantity determining unit that determines a basic quantity of the air from the target temperature determined by the target temperature determining unit and the torque determined by the torque determining;
    a target fuel quantity determining unit that determines a target quantity of the fuel from the basic quantity of the air determined by the basic air quantity determining unit and the target air-fuel ratio determined by the target air-fuel ratio determining unit; and
    a correction determining unit that determines a correction value for the actual quantity of the fuel from the difference between the actual quantity of the fuel and the target quantity of the fuel, and the air-fuel ratio controller controls the fuel valve to change the actual quantity of the fuel by the correction value such that the actual quantity of the fuel is controlled to the target air-fuel ratio.

8. The control device according to claim 3, further comprising:
an air quantity detecting element that detects an actual quantity of the air supplied to the engine,
wherein the air-fuel ratio controller comprises:
a fuel injection quantity determining unit that determines an actual quantity of the fuel from the actual air-fuel ratio and the actual quantity of the air detected by the air quantity detecting element;
a torque determining unit that determines a torque required of the engine; and
a target fuel quantity determining unit that determines a target quantity of the fuel from the target temperature determined by the target temperature determining unit, the torque determined by the torque determining unit and the target air-fuel ratio determined by the target air-fuel ratio determining unit, and
the air-fuel ratio controller controls the fuel valve to supply the target quantity of fuel to the engine such that the actual air-fuel ratio is controlled to the target air-fuel ratio to control a temperature of the exhaust emission purifier to the target temperature.

9. The control device according to claim 8, wherein the air-fuel ratio controller comprises:
a correction determining unit that determines a correction value for the actual quantity of the fuel from the difference between the actual quantity of the fuel and the target quantity of the fuel, and
the air-fuel ratio controller controls the fuel valve to change the actual quantity of the fuel by the correction value to control the actual air-fuel ratio to the target air-fuel ratio.

10. The control device according to claim 1, wherein the operating element is an air valve supplying the air to the engine.

11. The control device according to claim 10, wherein the air-fuel ratio controller comprises:
a correction determining unit that determines a correction value for a quantity of the air from a difference between the actual air-fuel ratio and the target air-fuel ratio, and
the air-fuel ratio controller controls the air valve to change a quantity of the air by the correction value such that the quantity of the air supplied by the air valve is used as a controlled variable in a feed forward control to control the actual air-fuel ratio to the target air-fuel ratio.

12. The control device according to claim 10, wherein
the air-fuel ratio controller controls the air valve according to the actual air-fuel ratio and the target air-fuel ratio determined by the target air-fuel ratio determining unit such that the actual air-fuel ratio is controlled to the target air-fuel ratio according to the feedback control to control a temperature of the exhaust emission purifier to the target temperature.

13. The control device according to claim 12, wherein the air-fuel ratio controller comprises:
a torque determining unit that determines a torque required of the engine, and
the target air-fuel ratio determining unit is adapted to determine the target air-fuel ratio from the target temperature and the torque determined by the torque determining unit.

14. The control device according to claim 1, further comprising an air quantity detecting element that detects an actual quantity of the air supplied to the engine, wherein the operating element has a fuel valve supplying the fuel to the engine and an air valve supplying the air to the engine,
wherein the air-fuel ratio controller comprises:
a fuel injection quantity determining unit that determines an actual quantity of the fuel from the actual air-fuel ratio and the actual quantity of the air detected by the air quantity detecting element;
a target fuel quantity determining unit that determines a target quantity of the fuel from the target temperature determined by the target temperature determining unit and the target air-fuel ratio determined by the target air-fuel ratio determining unit,
wherein the air-fuel ratio controller controls the fuel valve according to a difference between the actual quantity of the fuel and the target quantity of the fuel to supply the target quantity of fuel to the engine, and
wherein the air-fuel ratio controller controls the air valve according to a difference between the actual air-fuel ratio and the target air-fuel ratio determined by the target air-fuel ratio determining unit such that the actual air-fuel ratio is controlled to the target air-fuel ratio, a temperature of the exhaust emission purifier being controlled to the target temperature.

15. The control device according to claim 14, wherein the air-fuel ratio controller comprises:
a torque determining unit that determines a torque required of the engine,
the target air-fuel ratio determining unit is adapted to determine the target air-fuel ratio from the target temperature and the torque determined by the torque determining unit, and
the target fuel quantity determining unit is adapted to determine the target quantity of the fuel from the target temperature, the target air-fuel ratio and the torque determined by the torque determining unit.

16. The control device according to claim 1, wherein the operating element has an air valve supplying the air to the engine and a fuel valve supplying the fuel in the engine, the air-fuel ratio controller controls the air valve when a load on the engine is high such that the actual air-fuel ratio is controlled to the target air-fuel ratio, and the air-fuel ratio controller controls the fuel valve when a load on the engine is low such that the actual air-fuel ratio is controlled to the target air-fuel ratio.

17. The control device according to claim 1, wherein the operating element has an air valve supplying the air to the engine and a fuel valve supplying the fuel in the engine, the air-fuel ratio controller controls the air valve when a load on the engine is high such that the actual air-fuel ratio is controlled to the target air-fuel ratio, and the air-fuel ratio controller controls the air valve and the fuel valve when a load on the engine is low such that the actual air-fuel ratio is controlled to the target air-fuel ratio.

18. The control device according to claim 1, wherein the air-fuel ratio detecting element is adapted to detect an actual oxygen concentration of an exhaust gas outputted from the engine, and the air-fuel ratio controller is adapted to determines a target oxygen concentration of the exhaust gas corresponding to the target air-fuel ratio and to control the operating element in response to the actual oxygen concentration detected by the air-fuel ratio detecting element and the target oxygen concentration such that the actual oxygen concentration is controlled to the target oxygen concentration according to a feedback control to control a temperature of the exhaust emission purifier.

19. The control device according to claim 1, wherein the air-fuel ratio controller controls the air-fuel ratio A/F to be constant so that the temperature of exhaust gas of the engine is controlled to be a constant value.

20. A method of controlling regeneration of an exhaust emission purifier disposed in an exhaust system of the engine, the method comprising:
   detecting an actual air-fuel ratio of a quantity of air supplied to the engine and a quantity of fuel supplied to the engine;
   determining a target temperature of the exhaust emission purifier in the regeneration of the exhaust emission purifier from an internal condition of the exhaust emission purifier;
   determining a target air-fuel ratio from the determined target temperature;
   supplying, by an operating element, the air or the fuel to the engine; and
   controlling the detected actual air-fuel ratio to the target air-fuel ratio according to a feedback control, by controlling the operating element according to the actual air-fuel ratio and the target air-fuel ratio in the regeneration of the exhaust emission purifier, to control a temperature of the exhaust emission purifier to the target temperature.

21. The method of claim 20, further comprising determining a torque required of the engine, and determining the target air-fuel ratio from the target temperature and the torque.

22. The method of claim 20, wherein the air-fuel ratio A/F is controlled to be constant so that the temperature of exhaust gas of the engine is controlled to be a constant value.

* * * * *